(12) United States Patent
Tweedie et al.

(10) Patent No.: US 11,033,371 B2
(45) Date of Patent: Jun. 15, 2021

(54) CLEANING APPLIANCE

(71) Applicant: Dyson Technology Limited, Wiltshire (GB)

(72) Inventors: Robert Lawrence Tweedie, Swindon (GB); Christopher Graham Vincent, Swindon (GB); Geoffrey Michael Burlington, Gloucester (GB)

(73) Assignee: Dyson Technology Limited, Malmesbury (GB)

( * ) Notice: Subject to any disclaimer, the term of this patent is extended or adjusted under 35 U.S.C. 154(b) by 496 days.

(21) Appl. No.: 15/714,174

(22) Filed: Sep. 25, 2017

(65) Prior Publication Data

US 2018/0085207 A1    Mar. 29, 2018

(30) Foreign Application Priority Data

Sep. 26, 2016   (GB) ..................................... 1616273

(51) Int. Cl.
    *A61C 17/36*      (2006.01)
    *A61C 17/02*      (2006.01)
    (Continued)

(52) U.S. Cl.
    CPC .......... *A61C 17/36* (2013.01); *A61C 17/0202* (2013.01); *A61C 17/028* (2013.01);
    (Continued)

(58) Field of Classification Search
    CPC .............. A46B 11/002; A46B 11/0055; A46B 11/0058; A46B 13/04; A61C 1/0061;
    (Continued)

(56) References Cited

U.S. PATENT DOCUMENTS 1,899,295 A * 2/1933 Schulze ................. F02M 59/14
                                                 92/84
2,099,206 A * 11/1937 Hedblom ............... F02M 59/30
                                               74/833

(Continued)

FOREIGN PATENT DOCUMENTS

CN          85109318 A     6/1987
CN          103140188 A    6/2013
                  (Continued)

OTHER PUBLICATIONS

Search Report dated Mar. 1, 2017, directed to GB Application No. 1616273.7; 1 page.

(Continued)

*Primary Examiner* — Justine R Yu
*Assistant Examiner* — Matthew D Ziegler
(74) *Attorney, Agent, or Firm* — Morrison & Foerster LLP

(57) ABSTRACT

A pump assembly for a dental cleaning appliance includes a fluid chamber, a piston, and a drive. The drive rotates a coupling member having two angularly opposed pins. An arm pivotably connected to the piston has a seat for receiving one of the pins to couple the piston to the drive. Through continued rotation of the coupling member, the piston moves within the fluid chamber to draw fluid into the fluid chamber until the second detent contacts the arm to push it away from the first detent to decouple the drive from the piston. This allows a compressed spring to actuate the piston to urge a burst of fluid from the fluid chamber.

28 Claims, 16 Drawing Sheets

(51) Int. Cl.
*A61C 17/34* (2006.01)
*A61C 17/16* (2006.01)
*A61C 17/22* (2006.01)
*A61C 17/028* (2006.01)
*A61C 1/00* (2006.01)

(52) U.S. Cl.
CPC ............ *A61C 17/16* (2013.01); *A61C 17/227* (2013.01); *A61C 17/3427* (2013.01); *A61C 1/0092* (2013.01); *A61C 17/222* (2013.01); *A61C 17/3436* (2013.01)

(58) Field of Classification Search
CPC ..... A61C 1/0084; A61C 1/0092; A61C 17/00; A61C 17/02; A61C 17/0202; A61C 17/028; A61C 17/16; A61C 17/22; A61C 17/221; A61C 17/222; A61C 17/225; A61C 17/227; A61C 17/24; A61C 17/26; A61C 17/32; A61C 17/34; A61C 17/3427; A61C 17/3436; A61C 17/36; F04B 17/03; F04B 53/00; F04B 9/02–06; F04B 35/01; F04D 13/021; F04D 13/022; F04C 15/0073; F04C 29/0071
USPC .................. 417/223; 74/25, 53; 30/392–394
See application file for complete search history.

(56) References Cited

U.S. PATENT DOCUMENTS

| | | | | |
|---|---|---|---|---|
| 2,929,253 | A | | 3/1960 | Baldelli |
| 3,545,896 | A * | 12/1970 | Stanislav | F04B 53/164 417/471 |
| 3,959,967 | A * | 6/1976 | Chardonneau | F04B 1/02 60/382 |
| 4,046,290 | A * | 9/1977 | Louder | B01L 3/0206 222/267 |
| 4,146,020 | A * | 3/1979 | Moret | A61C 17/0202 15/22.1 |
| 4,412,823 | A * | 11/1983 | Sakai | A61C 17/38 433/80 |
| 4,527,769 | A * | 7/1985 | Stogner | F16K 31/1262 251/14 |
| 5,134,777 | A * | 8/1992 | Meyer | B23D 49/167 30/392 |
| 5,253,382 | A * | 10/1993 | Beny | A61C 17/40 15/22.1 |
| 7,386,904 | B2 * | 6/2008 | Fattori | A61C 17/349 15/167.1 |
| 7,654,271 | B2 * | 2/2010 | Wyatt | A45D 40/265 132/218 |
| 7,670,141 | B2 * | 3/2010 | Thomas | A61C 17/0202 433/80 |
| 8,522,384 | B2 | 9/2013 | Leung | |
| 9,370,408 | B2 * | 6/2016 | Wada | A61C 17/0202 |
| 10,034,731 | B2 * | 7/2018 | Chang | A61C 17/028 |
| 10,299,884 | B2 * | 5/2019 | Kloster | A61C 17/0202 |
| 2014/0248579 | A1 | 9/2014 | Edwards et al. | |
| 2015/0148782 | A1 | 5/2015 | Brown et al. | |
| 2016/0151133 | A1 | 6/2016 | Luettgen et al. | |

FOREIGN PATENT DOCUMENTS

| | | | |
|---|---|---|---|
| CN | 202982290 U | 6/2013 | |
| CN | 203943757 U | 11/2014 | |
| CN | 208640940 U | 3/2019 | |
| EP | 2737874 | 6/2014 | |
| GB | 1392089 A * | 4/1975 | ................ F04B 3/00 |
| WO | WO-2013/190428 | 12/2013 | |
| WO | 2014/140964 | 9/2014 | |
| WO | WO-2017098371 A1 * | 6/2017 | ........... A61C 17/225 |

OTHER PUBLICATIONS

International Search Report and Written Opinion dated Nov. 3, 2017, directed to International Application No. PCT/GB2017/052518; 10 pages.

The First Office Action dated Dec. 9, 2019, directed to CN Application No. 201710885037.0; 20 pages.

* cited by examiner

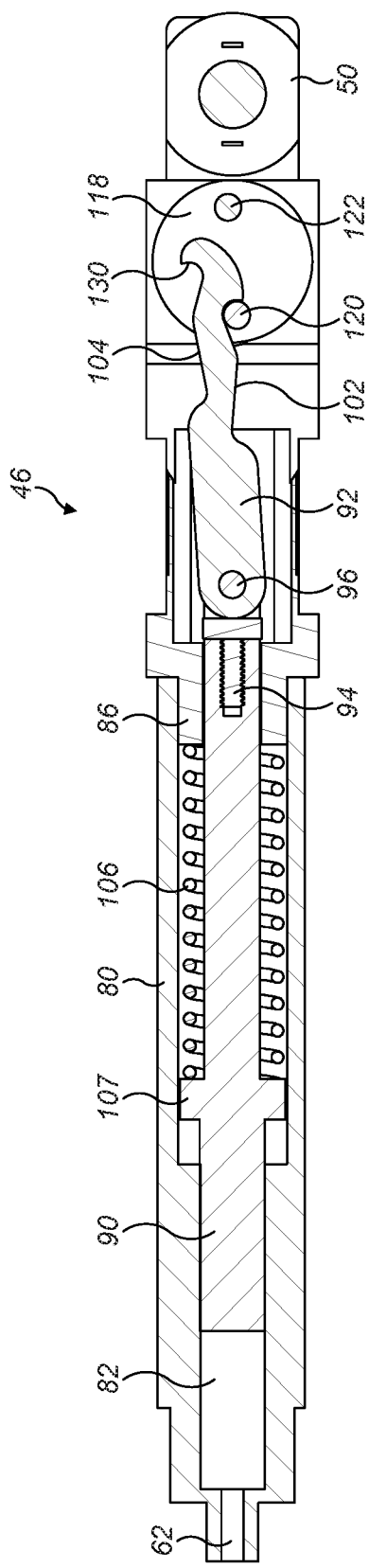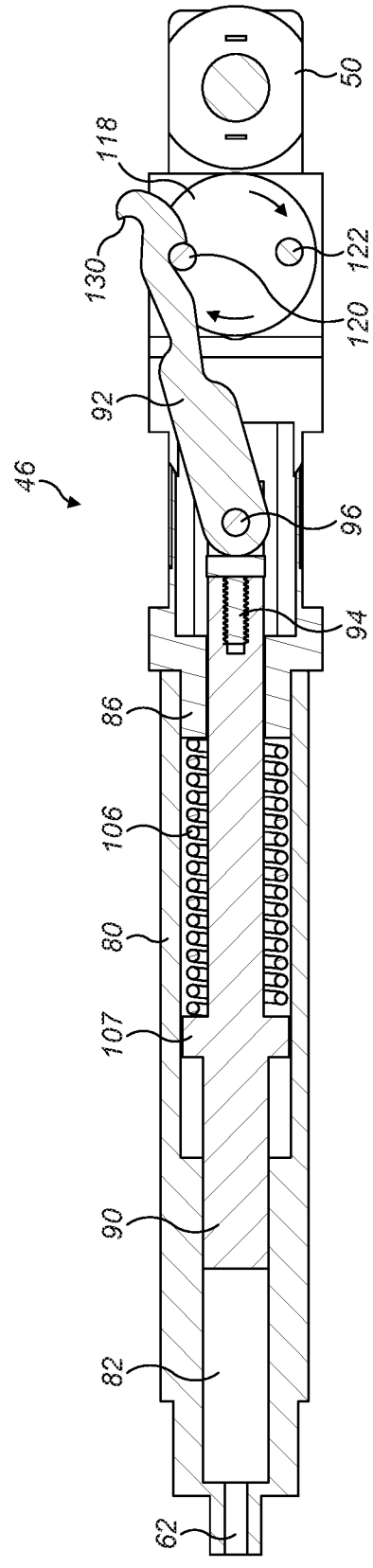
FIG. 5(a)
FIG. 5(b)

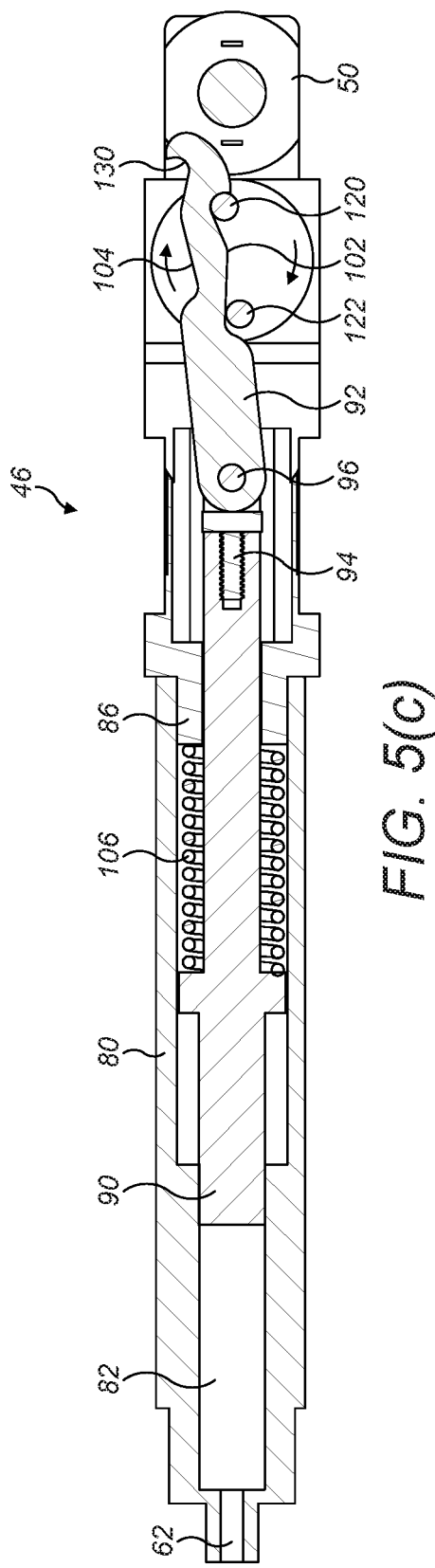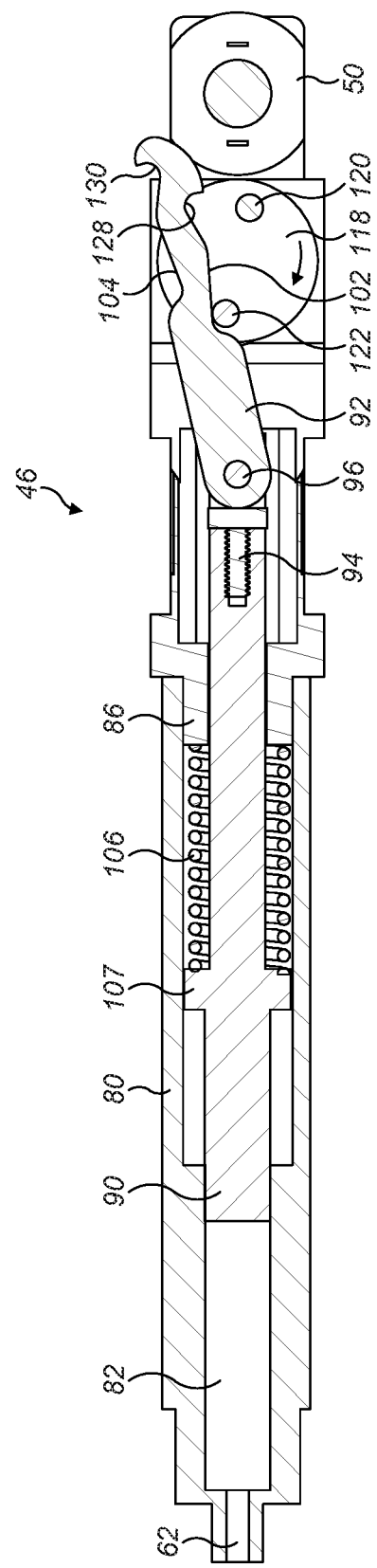

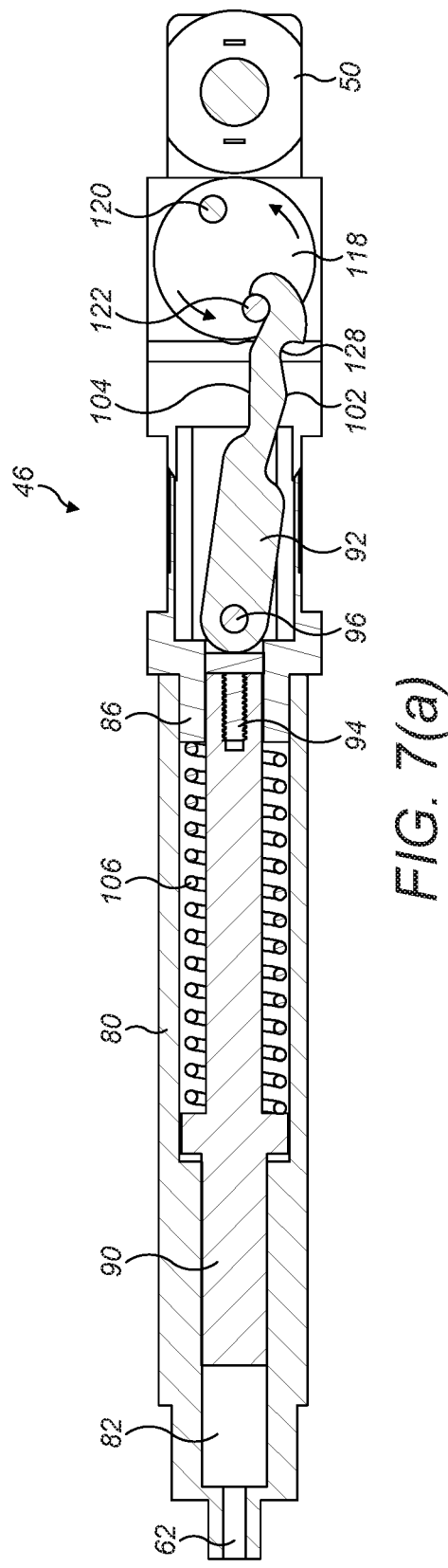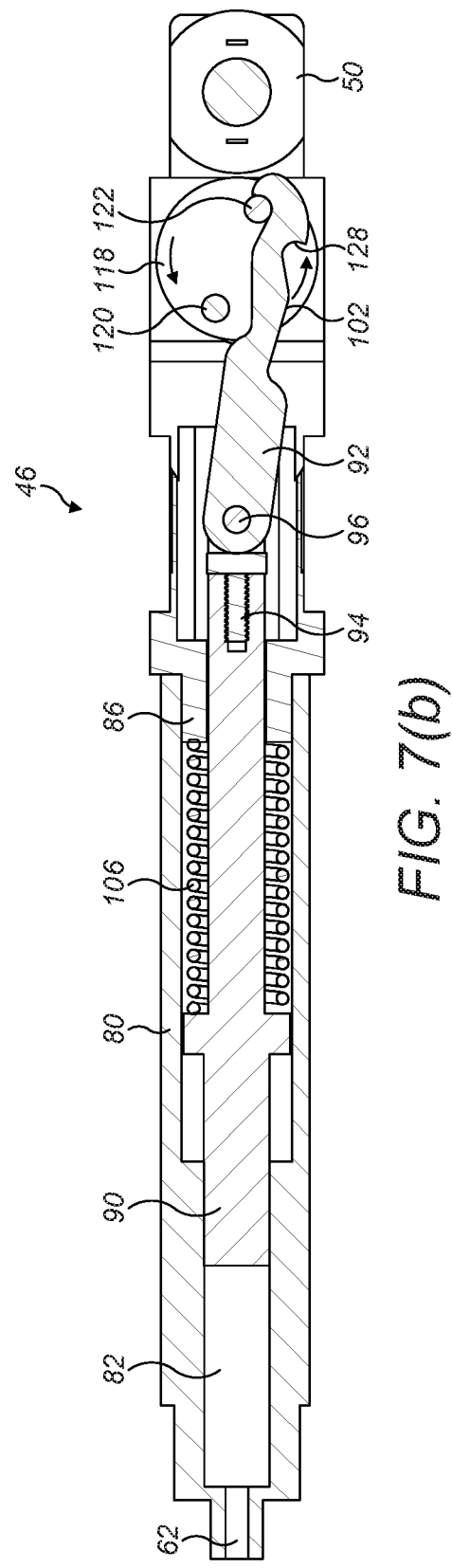
FIG. 7(a)
FIG. 7(b)

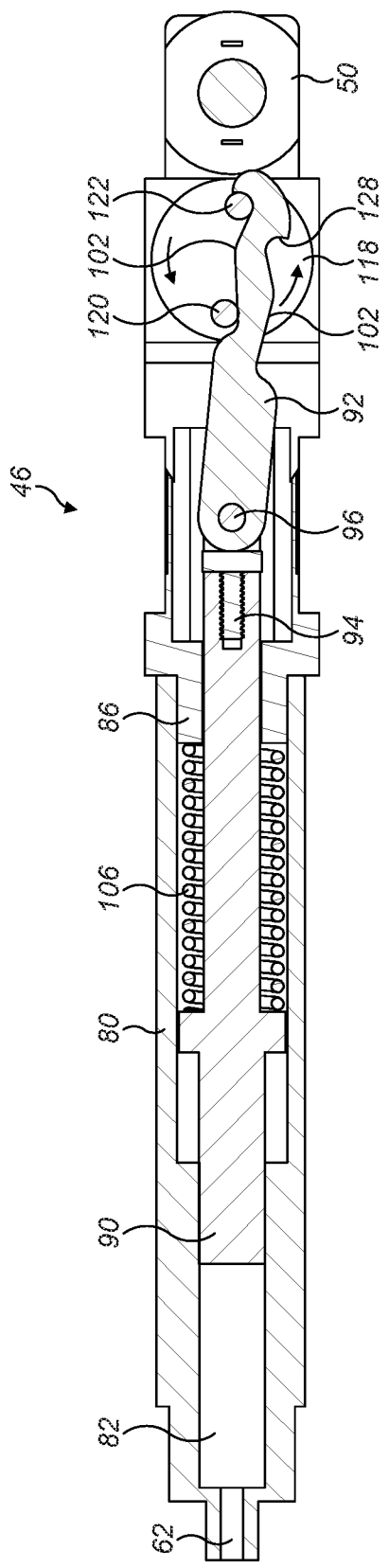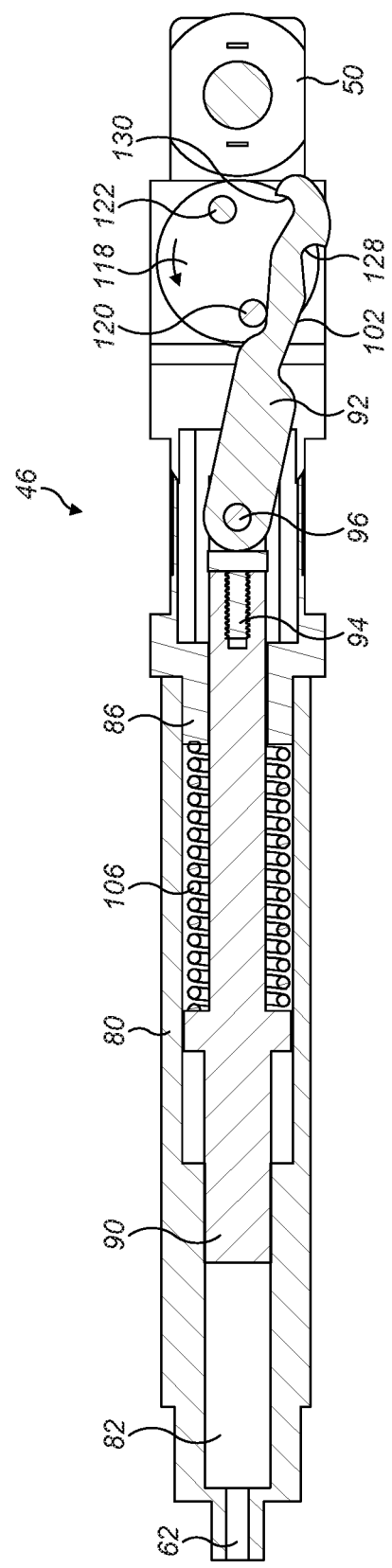
FIG. 7(c)
FIG. 7(d)

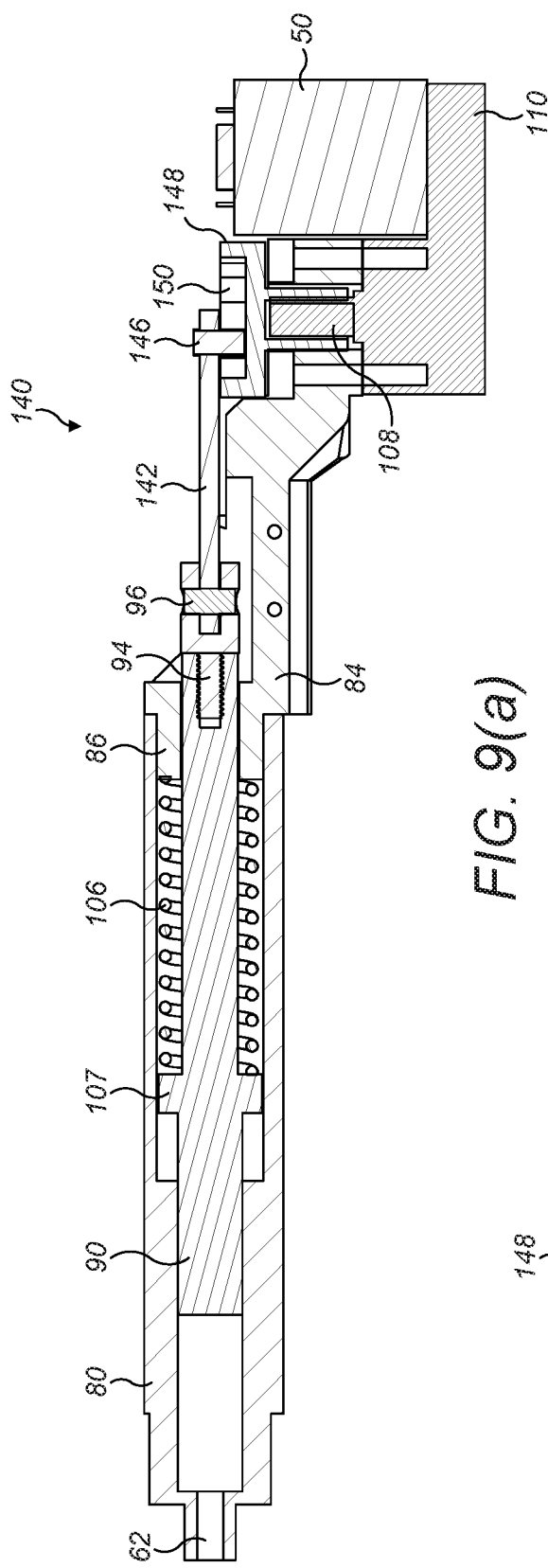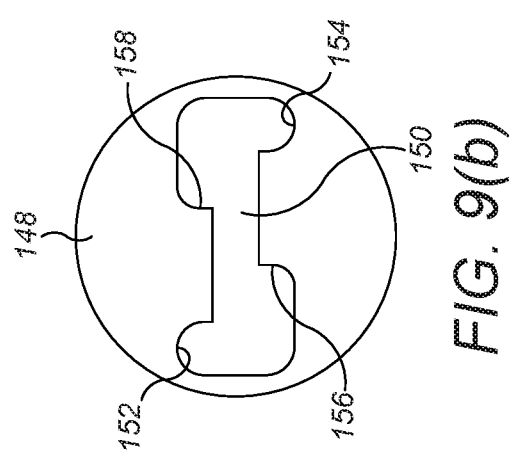

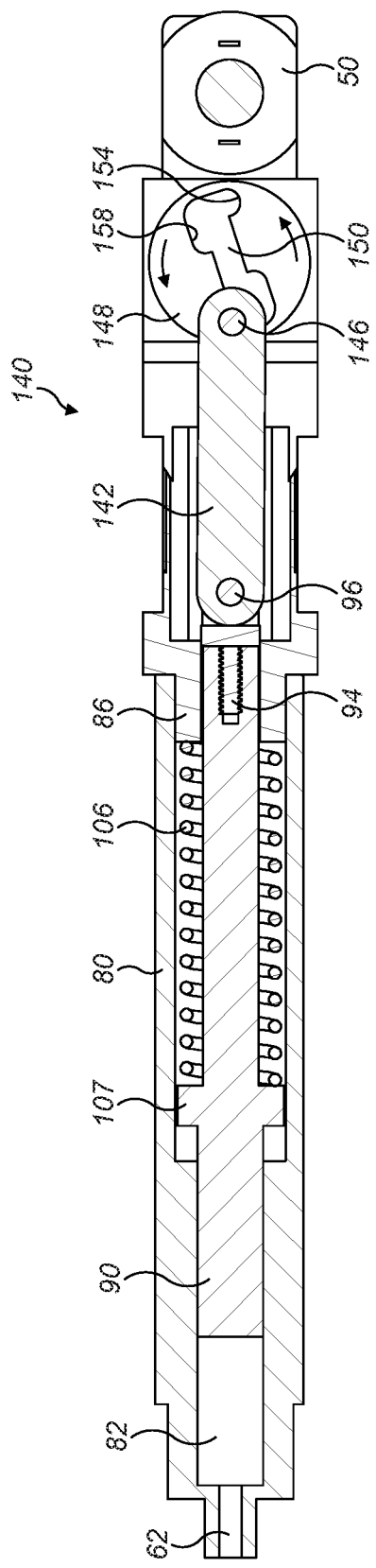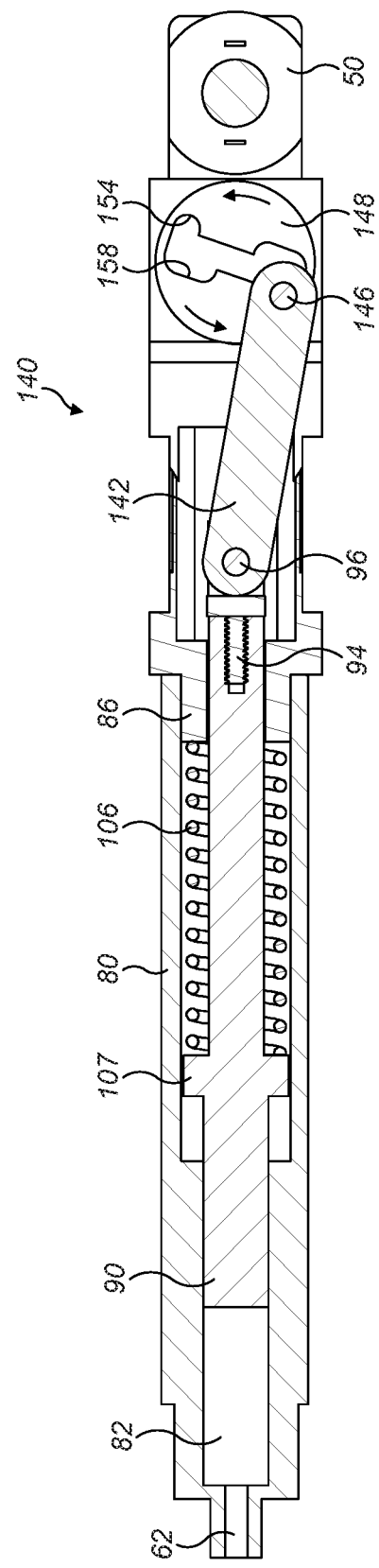

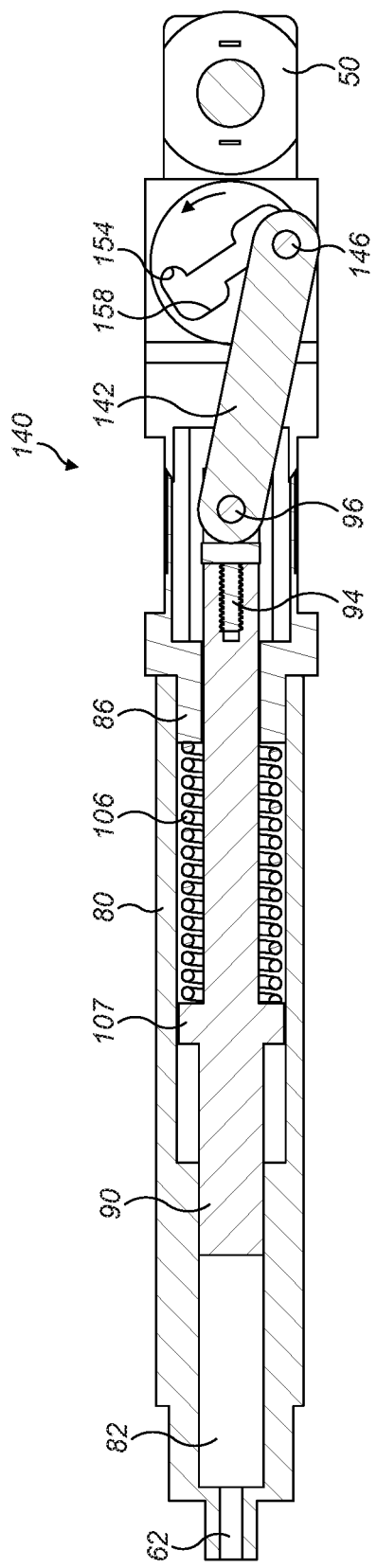
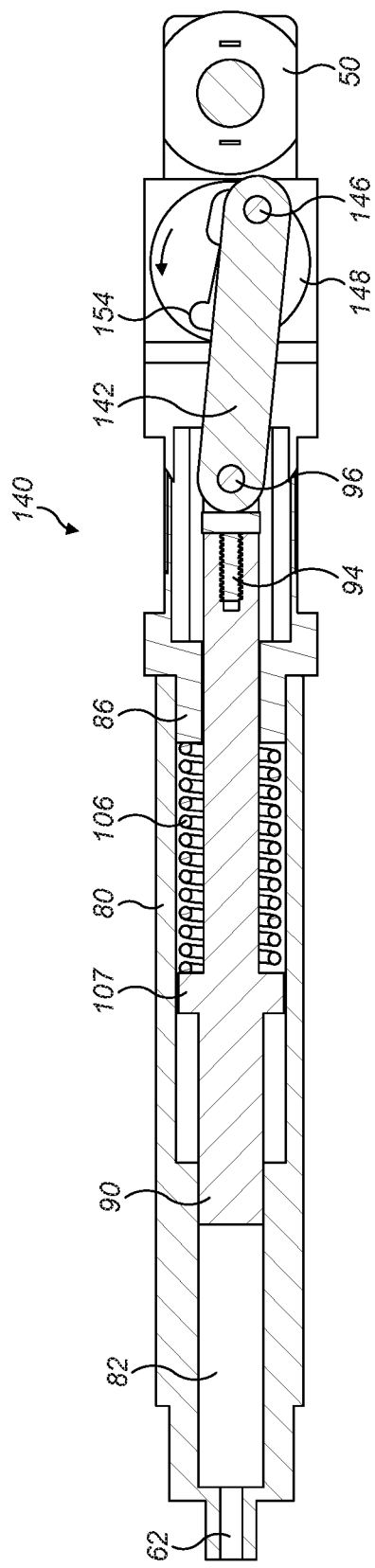
FIG. 10(c)
FIG. 10(d)

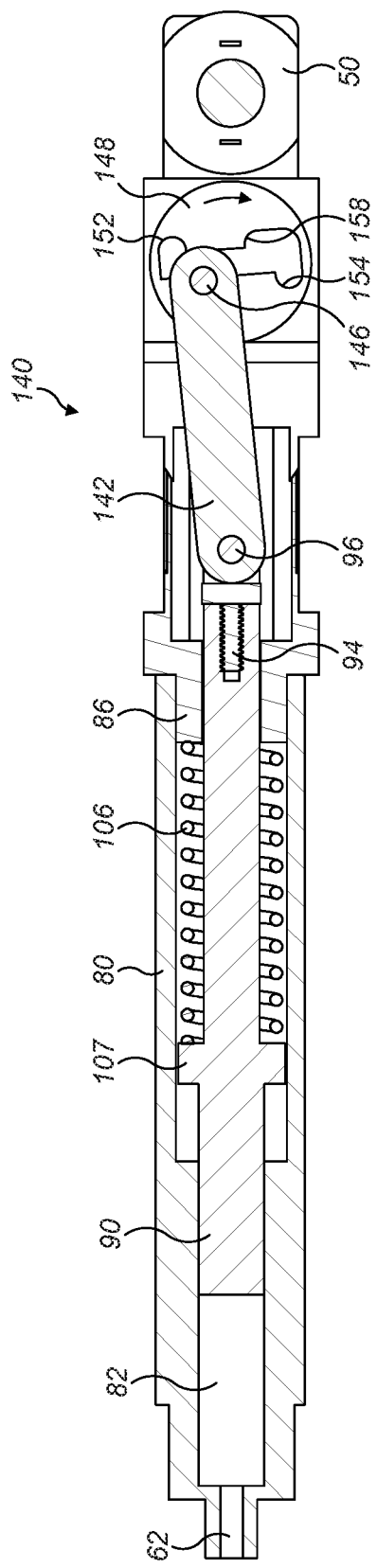
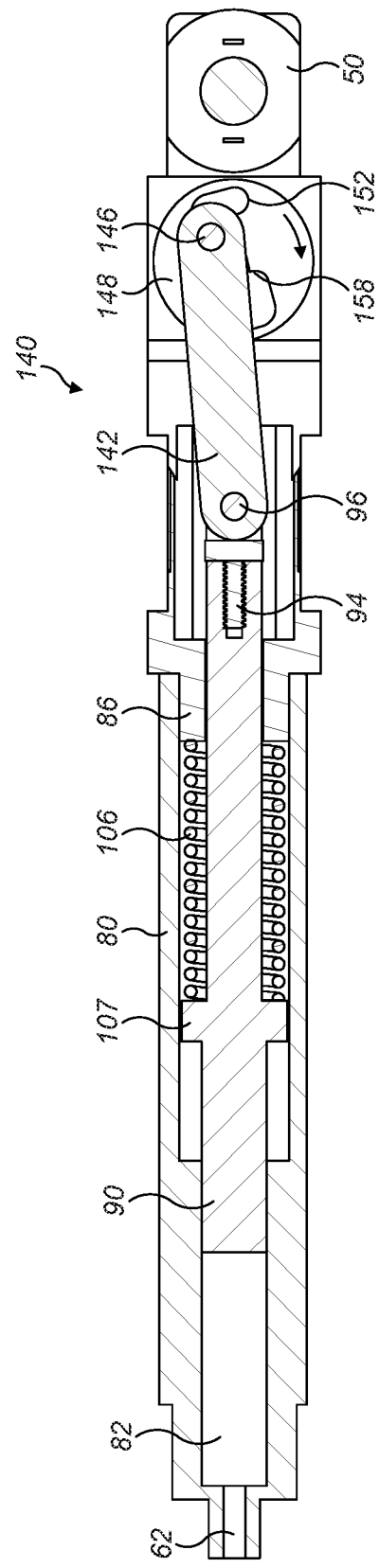
FIG. 11(a)
FIG. 11(b)

CLEANING APPLIANCE

REFERENCE TO RELATED APPLICATIONS

This application claims the priority of United Kingdom Application No. 1616273.7, filed Sep. 26, 2016, the entire contents of which are incorporated herein by reference.

FIELD OF THE INVENTION

The present invention relates to a pump assembly, and to a cleaning appliance which includes a pump assembly. The cleaning appliance is preferably a handheld cleaning appliance, and is preferably a surface treating appliance. In preferred embodiments of the invention, the appliance is a dental cleaning appliance. In a preferred embodiment, the appliance is a toothbrush having a fluid delivery system for delivering a fluid to the teeth of the user. This fluid may be toothpaste, or a fluid for improved interproximal cleaning. Alternatively, the appliance may not include any bristles or other elements for brushing teeth, and may be in the form of a dedicated interproximal cleaning appliance.

BACKGROUND OF THE INVENTION

Dental cleaning appliances can take one of a number of different formats. Electric toothbrushes generally comprise a cleaning tool which is connected to a handle. The cleaning tool comprises a stem and a brush head bearing bristles for brushing teeth. The brush head comprises a static section which is connected to the stem, and at least one moveable section which is moveable relative to the static section, for example with one of a reciprocating, oscillating, vibrating, pivoting or rotating motion, to impart a brushing movement to bristles mounted thereon. The stem houses a drive shaft which couples with a transmission unit within the handle. The transmission unit is in turn connected to a motor, which is driven by a battery housed within the handle. The drive shaft and the transmission unit convert rotary or vibratory motion of the motor into the desired movement of the moveable section of the brush head relative to the static section of the brush head.

It is known to incorporate into an electric toothbrush an assembly for generating a jet of fluid for interproximal cleaning. For example, U.S. Pat. No. 8,522,384 describes an electric toothbrush in which the handle of the toothbrush defines a fluid chamber for storing a liquid such as water, and a slidable cover for enabling the fluid chamber to be accessed for replenishment by a user. A fluid path connects the fluid chamber to a nozzle located on a static portion of the brush head. A pump located within the fluid path is actuated upon user operation of an actuator on the handle to pump fluid from the fluid chamber to the nozzle for release under pressure from the nozzle.

The pump is actuated by a motor. The motor rotates a pinion gear, which meshes with a crown gear to drive rotation of the crown gear about an axis orthogonal to the axis of rotation of the pinion gear. The rotation of the crown gear effects reciprocal movement of a pump crank shaft. The crank shaft is pivotally coupled to a piston which is moveable within a pump housing which receives fluid from the fluid chamber. The reciprocating movement of the crank shaft causes the piston to move in an oscillating manner within the pump housing to draw fluid into the pump housing and subsequently drive that fluid from the pump housing towards the nozzle.

SUMMARY OF THE INVENTION

In a first aspect, the present invention provides a pump assembly for a dental cleaning appliance, the pump assembly comprising a positive displacement pump comprising a fluid chamber having a fluid inlet connectable to a source of fluid, and a fluid outlet; a drive for actuating the pump to draw fluid into the fluid chamber through the fluid inlet; an energy storage device for converting kinetic energy generated during actuation of the pump by the drive into potential energy, and storing the potential energy; and a first coupling member connected to the pump and a second coupling member connected to the drive, the second coupling member being rotatable relative to the first coupling member; wherein one of the coupling members comprises a track for receiving a detent disposed on the other coupling member, the detent being moveable between a first track position, in which the drive is coupled to the pump, and a second track position with relative movement between the coupling members; whereby as the second coupling member rotates in a rotational direction from a first angular position, in which the detent is in the first track position, to a second angular position which is angularly spaced from the first angular position, the detent remains in the first track position so that the pump is actuated by the drive to draw fluid into the fluid chamber, and as the second coupling member rotates in said rotational direction from the second angular position towards the first angular position, the detent becomes spaced from the first track position to enable the energy storage device to use stored potential energy to actuate the pump to urge a burst of fluid from the fluid chamber through the fluid outlet.

The drive preferably comprises a motor and a control circuit for driving the motor to rotate the second coupling member. One or more gears may be connected between the motor and the second coupling member. The second coupling member preferably comprises a rotatable disc or drum.

Preferably, the track comprises a seat for receiving the detent at the first track position. The seat may be configured to physically retain the detent in the first track position as the second coupling member rotates from the first angular position to the second angular position. For example, the seat may be provided by a notch or a groove formed in the track at the first track position. Alternatively, the seat may comprise a curved portion of the track, such as a hook located at one end of the track, a shoulder or other protrusion formed on, or connected to, the track which serves to retain the detent as the second coupling member moves from the first angular position to the second angular position. As another alternative, the seat may be configured to magnetically retain the detent in the first track position as the second coupling member rotates from the first angular position to the second angular position. For example, the track may comprise a magnet towards which the detent is attracted, or a portion of the track adjacent to, or at, the first track position may be formed from ferromagnetic material which is attracted to a magnetic detent.

The positive displacement pump preferably comprises a fluid displacement member which is moveable relative to the fluid chamber to draw fluid into the fluid chamber, and to subsequently urge a burst of fluid from the fluid chamber. The fluid displacement member is preferably moveable along a linear path relative to the fluid chamber. In a preferred embodiment, the positive displacement pump is in the form of a piston pump, in which the fluid displacement member is a piston which is reciprocally movable within the fluid chamber to draw fluid into the fluid chamber and to subsequently urge that fluid from the fluid chamber.

The energy storage device is preferably in the form of a spring, but alternatively it may be in the form of an accumulator. The energy storage device is preferably arranged to engage the fluid displacement member. When the energy storage device is in the form of a spring, the spring becomes compressed as the fluid displacement member moves relative to the fluid chamber to draw fluid into the chamber. When the pump is decoupled from the drive, the spring rapidly expands and urges movement of the fluid displacement member in a reverse direction to urge fluid from the fluid chamber.

The first coupling member preferably comprises an arm pivotably connected to the fluid displacement member. The second coupling member preferably comprises a rotatable disc or drum connected to the drive.

In one embodiment, the first coupling member is said one of the coupling members, and the second coupling member is said other coupling member. In other words, the first coupling member, or arm, comprises the track, and the second rotatable coupling member, or drum, comprises the detent which is received by the track. The detent is preferably in the form of a pin which is spaced from the rotational axis of the drum.

In this embodiment, the track is preferably provided by a first side surface of the arm, which is engaged by the detent, and thus receives the detent, during the rotation of the drum from its first angular position to its second angular position. With the pump being coupled to the drive as the drum rotates from its first angular position to its second angular position, the fluid displacement member moves relative to the fluid chamber to draw fluid into the fluid chamber. When the drum is in its second angular position, the drive can be stopped to hold the pump assembly in a primed configuration, in which the fluid chamber holds a volume of fluid for ejection from the pump.

The ejection of fluid from the pump is actuated by the drive rotating the drum in the same rotational direction to rotate the drum from its second angular position back towards the first angular position. This operation of the drive may be actuated by the receipt of an actuating signal by the control circuit.

As the second coupling member rotates from the second angular position towards the first angular position, the detent becomes released from the track to decouple the drive from the pump, and so allow the energy storage device to actuate the pump through its engagement with the fluid displacement member. For example, the motion of the arm with the detent may be inhibited beyond the second angular position, for example by a stop member so that the detent becomes spaced from the track through rotation of the drum. The stop member may be stationary, for example the stop member may be located on a housing of the pump which the coupling members move relative thereto. Alternatively, the stop member may be a moving stop member which moves relative to the arm to engage the arm when the drum is in its second angular position. The movement of the stop member relative to the arm may be actuated by a separate mechanism which is controlled by the control circuit. Preferably, the stop member is located on the drum so that the stop member engages the arm as the drum moves to its second angular position. In one embodiment, the stop member is provided by a second detent provided on the drum. The second detent preferably has the same size and shape as the first-mentioned detent (referred to hereafter as the first detent), and is preferably angularly spaced from the first detent. In one embodiment, the first detent and the second detent are located at opposite angular positions on the drum. As the drum rotates from its first angular position to its second angular position, the second detent moves relative to the arm so as to contact the arm, preferably the first side surface of the arm, as the drum reaches its second angular position.

As the second coupling member rotates from the second angular position towards the first angular position, the second detent, moving with the drum, pushes the arm away from the first detent, which simultaneously moves with the drum away from the track. This movement decouples the drive from the pump to allow the energy storage device to actuate the pump to urge fluid from the fluid chamber.

The second detent is preferably arranged to engage the track, in this embodiment the first side surface of the arm, at the second track position. The actuation of the pump by the energy storage device causes the arm to move, with the fluid displacement member, relative to the drum. This movement of the arm relative to the drum causes the second detent to move along the track from the second track position towards the first track position. Depending on the shape of the track, under the action of the energy storage device the second detent may move immediately to the first track position, or it may move to an intermediary track position located between the first track position and the second track position, so that the second detent only moves to the first track position following continued rotational movement of the drum from the second angular position. Once the second detent is located in the first track position, the first detent and the second detent have effectively exchanged roles; the second detent is retained by the arm to couple the pump to the drive as the drum rotates from the second angular position to the first angular position, whilst the first detent engages the arm at the second track position when the drum reaches the first angular position to decouple the pump from the drive. As above, the actuation of the pump by the energy storage device causes the arm to move, with the fluid displacement member, relative to the drum. This movement of the arm relative to the drum causes the first detent to move along the track from the second track position towards the first track position.

The first angular position and the second angular position of the drum are preferably angularly spaced by 180°. Consequently, with one full rotation of the drum, in which the drum starts in the first angular position and returns to the first angular position, the pump is operated twice to eject two separate burst of fluid from the fluid chamber, and with the stroke of the fluid displacement member within the fluid chamber, and thus the volume of fluid drawn into the fluid chamber, being the same irrespective of which detent is retained by the track.

In a second aspect the present invention provides a pump assembly for a dental cleaning appliance, the pump assembly comprising a positive displacement pump comprising a fluid chamber having a fluid inlet connectable to a source of fluid, and a fluid outlet; a drive for actuating the pump to draw fluid into the fluid chamber through the fluid inlet; an energy storage device for converting kinetic energy generated during actuation of the pump by the drive into potential energy, and storing the potential energy; and a first coupling member connected to the pump and a second coupling member connected to the drive, the second coupling member being rotatable relative to the first coupling member; wherein the second coupling member comprises a first detent and a second detent angularly spaced from the first detent, and the first coupling member comprises a track, each detent being moveable between a first track position, in which the drive is coupled to the pump, and a second track position with relative movement between the coupling members; whereby as the second coupling member rotates in a rotational direction from a first angular position, in which the first detent is in the first track position, to a second angular position which is angularly spaced from the first angular position, the first detent remains in the first track position so that the pump is actuated by the drive to draw fluid into the fluid chamber, and as the second coupling member rotates in said rotational direction from the second angular position towards the first angular position, the second detent engages the first coupling member at the second track position to space the first detent from the first track position, which enables the energy storage device to use stored potential energy to actuate the pump to urge a burst of fluid from the fluid chamber through the fluid outlet, and move the track relative to the detents such that the second detent moves along the track from the second track position towards the first track position.

The pump assembly may be arranged to eject a different volume of fluid from the fluid chamber. In this embodiment, the arm may comprise a second track for receiving the first detent with rotation of the second coupling member in a second rotational direction opposite to the first rotational direction. With relative movement between the coupling members, the first detent is moveable along the second track between a first track position, in which the drive is coupled to the pump, and a second track position. As the second coupling member rotates, in the second rotational direction, from a third angular position, in which the first detent is in the first track position of the second track, to a fourth angular position which is angularly spaced from the third angular position, the first detent remains in the first track position of the second track so that the pump is actuated by the drive to draw fluid into the fluid chamber. As the second coupling member rotates in the second rotational direction from the fourth angular position towards the third angular position, the first detent becomes spaced from the first track position of the second track to enable the energy storage device to use stored potential energy to actuate the pump to urge a burst of fluid from the fluid chamber through the fluid outlet.

The second track is preferably located on a second side surface of the arm, which second side surface is preferably located opposite to the first side surface. Similar to the first side surface, the second side surface of the arm preferably comprises a second seat for receiving the first detent at a first track position of the second track, and from which the first detent becomes spaced as the second coupling member rotates in the second rotational direction from the fourth angular position towards the third angular position. As above, with this rotation of the second coupling member the second detent engages the second side surface of the arm to move the arm away from the first detent to allow the energy storage device to actuate the pump to urge fluid from the fluid chamber.

The second detent is preferably arranged to engage the track, in this instance the second side surface of the arm, at the second track position. The actuation of the pump by the energy storage device causes the arm to move, with the fluid displacement member, relative to the drum. This movement of the arm relative to the drum causes the second detent to move along the track from the second track position towards the first track position.

The first track and the second track preferably have different shapes. Under the action of the energy storage device, the second detent preferably moves along the second track to a different intermediary track position than when it moves along the first track under that action. Through having a different intermediary track position on the second track, the extent of the angular movement of the drum relative to the arm which is required to bring the second detent to the first track position of the second track can be different from that required to bring the second detent to the first track position of the first track. This can have the result that the extent of the movement of the arm with the drum, and thus the stroke of the fluid displacement member within the fluid chamber, can be varied by changing the rotational direction of the drum. For example, when the drum is rotated in the first direction, the volume of fluid drawn into, and subsequently ejected from, the pump is preferably in the range from 0.15 to 0.25 ml, whereas when the drum is rotated in the second direction the volume of fluid drawn into, and subsequently ejected from, the pump is preferably in the range from 0.05 to 0.20 ml.

In a second embodiment, the second coupling member is said one of the coupling members, and the first coupling member is said other coupling member. In other words, the first coupling member, or arm, comprises a detent, and the second rotatable coupling member, or drum, comprises a track for receiving the detent.

The detent is preferably in the form of a pin mounted on the arm. The track is provided by a slot formed in the second coupling member. The slot is preferably generally linear in shape, and extends perpendicular to, and across, the rotational axis of the second coupling member. The first track position is located at or towards one end of the slot, and the second track position is located at or towards the other end of the slot. The first track position and the second track position are preferably located at opposite angular positions of the second coupling member. At each track position, the slot preferably comprises a respective seat for receiving the detent, which may be in the form of a locally enlarged portion of the slot.

In the first angular position of the second coupling member, the first track position is located proximate to the fluid displacement member and the second track position is located remote from the fluid displacement member. The detent is located in the first track position, and the pump is coupled to the drive. As the second coupling member rotates from its first angular position to its second angular position, the fluid displacement member moves relative to the fluid chamber to draw fluid into the fluid chamber.

The first angular position and the second angular position of the second coupling member are preferably angularly spaced may be spaced by an angle in the range from 140 to 180°, and in a preferred embodiment by an angle of around 150°. As the second coupling member reaches its second angular position the drive can be stopped to hold the pump assembly in a primed configuration in which the fluid chamber holds a volume of fluid for ejection from the pump.

The ejection of fluid from the pump is actuated by the drive rotating the second coupling member in the same rotational direction to rotate it back towards the first angular position. This operation of the drive may be actuated by the receipt of an actuating signal by the control circuit.

As the second coupling member rotates, the detent becomes released from the first track position to allow the energy storage device to actuate the pump through its engagement with the fluid displacement member. Under the action of the energy storage device, the detent moves within the slot to the second track position located at or towards the other end of the slot. The detent becomes retained by the seat located at the second track position so following a 180° rotation of the second coupling member the pump assembly can be returned to a primed configuration.

In a third aspect the present invention provides a pump assembly for a dental cleaning appliance, the pump assembly comprising a positive displacement pump comprising a fluid chamber having a fluid inlet connectable to a source of fluid, and a fluid outlet; a drive for actuating the pump to draw fluid into the fluid chamber through the fluid inlet; an energy storage device for converting kinetic energy generated during actuation of the pump by the drive into potential energy, and storing the potential energy; and a first coupling member connected to the pump and a second coupling member connected to the drive, the second coupling member being rotatable relative to the first coupling member; wherein the first coupling member comprises a detent and the second coupling member comprises a track, the detent being moveable between a first track position and a second track position with relative movement between the coupling members, the drive being coupled to the pump when the detent is in each track position; whereby as the second coupling member rotates in a rotational direction from a first angular position, in which the first detent is in the first track position, to a second angular position which is angularly spaced from the first angular position, the first detent remains in the first track position so that the pump is actuated by the drive to draw fluid into the fluid chamber, and as the second coupling member rotates in said rotational direction from the second angular position towards the first angular position, the detent becomes released from the first track position, which enables the energy storage device to use stored potential energy to actuate the pump to urge a burst of fluid from the fluid chamber through the fluid outlet, and move the detent along the track towards the second track position.

The pump assembly preferably forms part of a dental cleaning appliance, which comprises a nozzle for delivering a burst of fluid to the teeth of a user. The appliance may be in the form of a dedicated interproximal cleaning appliance for cleaning between the gaps in the user's teeth. Alternatively, the appliance may be in the form of a toothbrush which has the additional function of improved interproximal cleaning through the emission of a burst of working fluid into the interproximal gap. As the nozzle is moved between adjacent teeth of the user, the user may depress a button of a user interface provided on a handle of the appliance to actuate the pump assembly to cause a burst of working fluid to be ejected from the nozzle. Alternatively, the appliance may be configured to actuate the delivery of working fluid to the teeth of the user automatically depending on the magnitude of an output from a sensor for detecting that the nozzle is located within an interproximal gap. For example, the sensor may be in the form of a light detector, such a camera or a light sensor, for receiving light, such a visible light or infrared light, reflected from a user's teeth. As another alternative, the appliance may be configured to actuate the delivery of working fluid to the teeth of the user automatically at a fixed frequency, for example between 0.5 and 5 Hz.

In a fourth aspect, the present invention provides a dental cleaning appliance comprising a handle; a fluid reservoir for storing a working fluid; and a fluid delivery system for receiving working fluid from the fluid reservoir, and for delivering a burst of working fluid to the teeth of a user; wherein the fluid delivery system comprises a pump assembly as aforementioned in any of the first to third aspects of the invention.

The pump assembly is preferably located within the handle of the appliance. The appliance preferably comprises a head, and a stem extending between the head and the handle. The nozzle preferably protrudes outwardly from the head. A plurality of bristles may be attached to a static section of the head, which section is not moveable relative to the handle. Alternatively, or additionally, a plurality of bristles may be attached to a moveable section of the head, which section is moveable relative to the handle. In a preferred embodiment, the appliance comprises a brush unit comprising a bristle carrier and a plurality of bristles mounted on the bristle carrier, with the bristle carrier being moveable relative to the handle.

The fluid reservoir preferably has a capacity in the range from 5 to 50 ml. For example, a fluid reservoir having a capacity of 25 ml, used in combination with a pump assembly which ejects bursts of fluid each having a fluid capacity of up to 0.25 ml, can supply a sufficient quantity of working fluid to the fluid chamber to allow up to 100 bursts of 0.25 ml of working fluid to be delivered to the teeth of a user.

The fluid reservoir is preferably refillable. The fluid reservoir thus preferably comprises a fluid port through which the fluid reservoir may be replenished with working fluid by the user. The fluid port may be located in a wall which delimits the fluid reservoir, or it may be located remotely from the fluid reservoir and placed in fluid communication with the fluid reservoir by a fluid conduit which extends from the fluid port to the fluid reservoir.

The handle of the appliance may comprise the fluid reservoir. For example, the fluid reservoir may be fully contained within the body of the handle. Alternatively, an external wall of the handle may at least partially delimit the fluid reservoir. At least part of that external wall may be transparent to allow a user to see the volume of working fluid contained within the fluid reservoir. To replenish such a fluid reservoir, the fluid port may be exposed manually by the user through moving a cover on the body of the handle, or through removing a bung or other closure device from the fluid port.

The fluid reservoir may be housed within the stem. As above, an external wall of the stem may at least partially delimit the fluid reservoir, and at least part of that external wall may be transparent to allow a user to see the volume of working fluid contained within the fluid reservoir.

As an alternative to housing the fluid reservoir within the stem, the fluid reservoir may be connected to the stem so as to be located externally of the stem. This can allow the fluid reservoir to be detached from the stem for replenishment or replacement as required. Alternatively, the fluid reservoir may be partially delimited by an external wall which is connected to the stem. Again, at least part of that external wall may be transparent to allow a user to see the volume of working fluid contained within the fluid reservoir. To maximize the capacity of the fluid reservoir and to provide for a relatively even weight distribution about the longitudinal axis of the appliance, the fluid reservoir preferably extends about, or surrounds, the stem.

BRIEF DESCRIPTION OF THE DRAWINGS

Preferred features of the present invention will now be described by way of example only with reference to the accompanying drawings, in which:

FIG. 5(a) is a top cross-sectional view of the pump assembly in a first configuration in a first operational mode, FIG. 5(b) is a top cross-sectional view of the pump assembly in a second configuration in the first operational mode, FIG. 5(c) is a top cross-sectional view of the pump assembly in a third configuration in the first operational mode, FIG. 5(d) is a top cross-sectional view of the pump assembly in an exaggerated fourth configuration in the first operational mode.

FIG. 7(a) is a top cross-sectional view of the pump assembly in a first configuration in the second operational mode, FIG. 7(b) is a top cross-sectional view of the pump assembly in a second configuration in the second operational mode, FIG. 7(c) is a top cross-sectional view of the pump assembly in a third configuration in the second operational mode, FIG. 7(d) is a top cross-sectional view of the pump assembly in an exaggerated fourth configuration in the second operational mode.

FIG. 9(a) is a side cross-sectional view of the pump assembly of FIG. 8, and FIG. 9(b) is a top view of the drum of the pump assembly of FIG. 8;

FIG. 10(a) is a top cross-sectional view of the pump assembly of FIG. 8 in a first configuration in a first operational mode, FIG. 10(b) is a top cross-sectional view of the pump assembly in a second configuration in the first operational mode, FIG. 10(c) is a top cross-sectional view of the pump assembly in a third configuration in the first operational mode, and FIG. 10(d) is a top cross-sectional view of the pump assembly in a fourth configuration in the first operational mode; and FIG. 11(a) is a top cross-sectional view of the pump assembly of FIG. 8 in a first configuration in the second operational mode, FIG. 11(b) is a top cross-sectional view of the pump assembly in a second configuration in the second operational mode.

DETAILED DESCRIPTION OF THE INVENTION

Figure 1A:
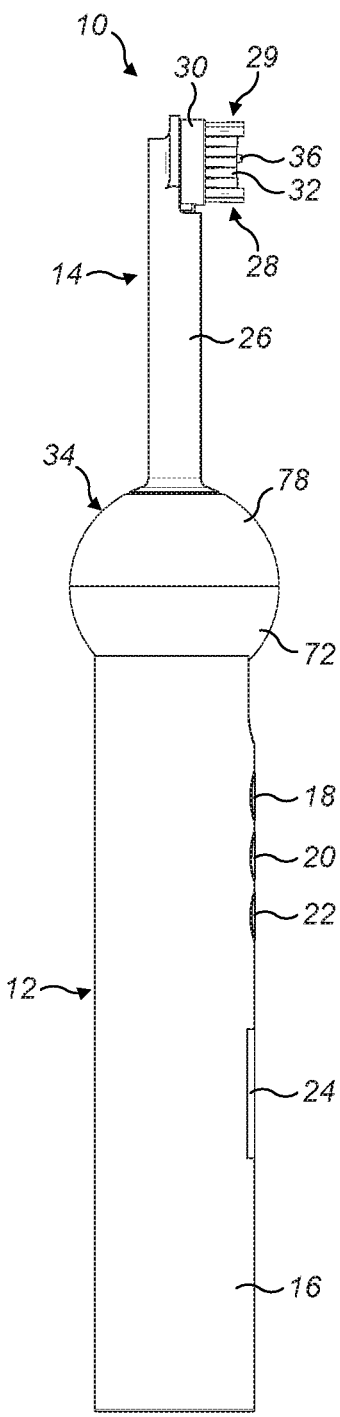
FIG. 1(a) is a right side view of a dental cleaning appliance.
Figure 1B:
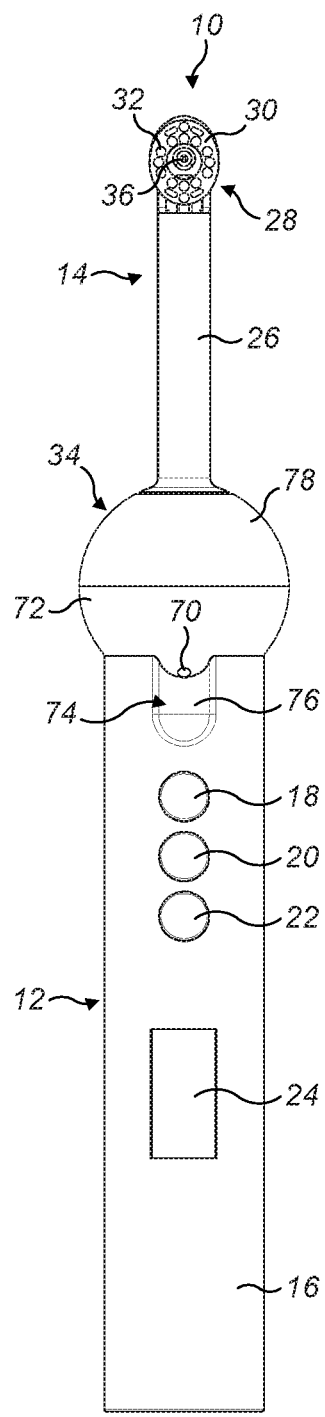
FIG. 1(b) is a front view of the appliance.
Figure 1C:
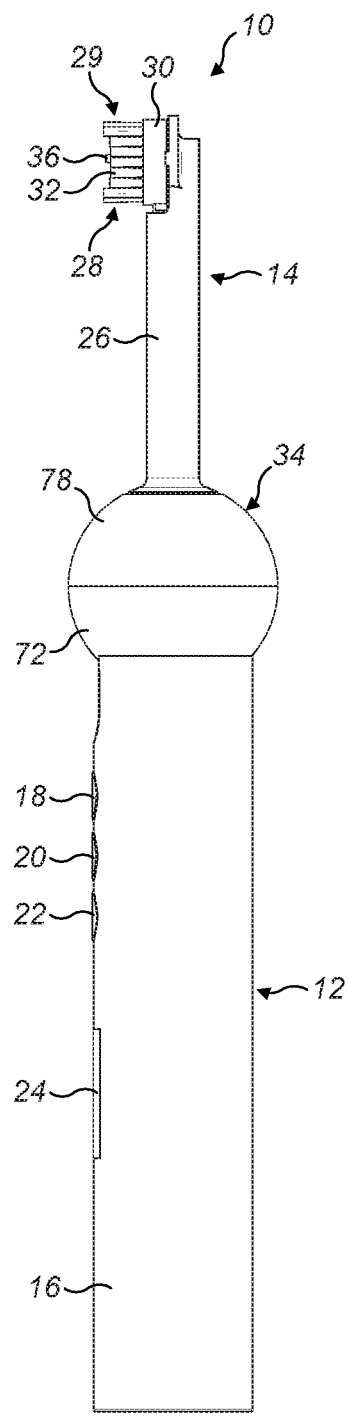
FIG. 1(c) is a left side view of the appliance.

FIGS. 1(a) to 1(c) illustrate external views of an embodiment of a dental cleaning appliance 10. In this embodiment, the appliance is in the form of a handheld appliance, which is in the form of an electric toothbrush having an integrated assembly for dispensing a working fluid for improved interproximal cleaning.

The appliance 10 comprises a handle 12 and a cleaning tool 14. The handle 12 comprises an external body 16 which is gripped by a user during use of the appliance 10. The body 16 is preferably formed from plastics material, and is preferably generally cylindrical in shape. The handle 12 comprises a plurality of user operable buttons 18, 20, 22 which are located within respective apertures formed in the body 16 so as to be accessible to the user. The handle 12 further comprises a display 24 which is positioned so as to be visible to a user during use of the appliance. In this embodiment, the display 24 is also located within a respective aperture formed in the body 16.

The cleaning tool 14 comprises a stem 26 and a head 28. The stem 26 is elongate in shape, which serves to space the head 28 from the handle 12 to facilitate user operability of the appliance 10. In this embodiment, the head 28 of the cleaning tool 14 comprises a brush unit 29, which comprises a bristle carrier 30 and a plurality of bristles 32 mounted on the bristle carrier 30. However, in other embodiments the cleaning tool 14 may be provided without a brush unit 29 so that the appliance is in the form of a dedicated interproximal cleaning appliance for cleaning between the gaps in the user's teeth.

The cleaning tool 14 also comprises a fluid reservoir 34 for storing a working fluid, and a nozzle 36 for delivering one or more bursts of working fluid to the teeth of the user during use of the appliance 10. The fluid reservoir 34 is connected to the stem 26. The fluid reservoir 34 extends at least partially around the stem 26. In this embodiment which includes a brush unit 29, the brush unit 29 extends at least partially around the nozzle 36.

Figure 2:
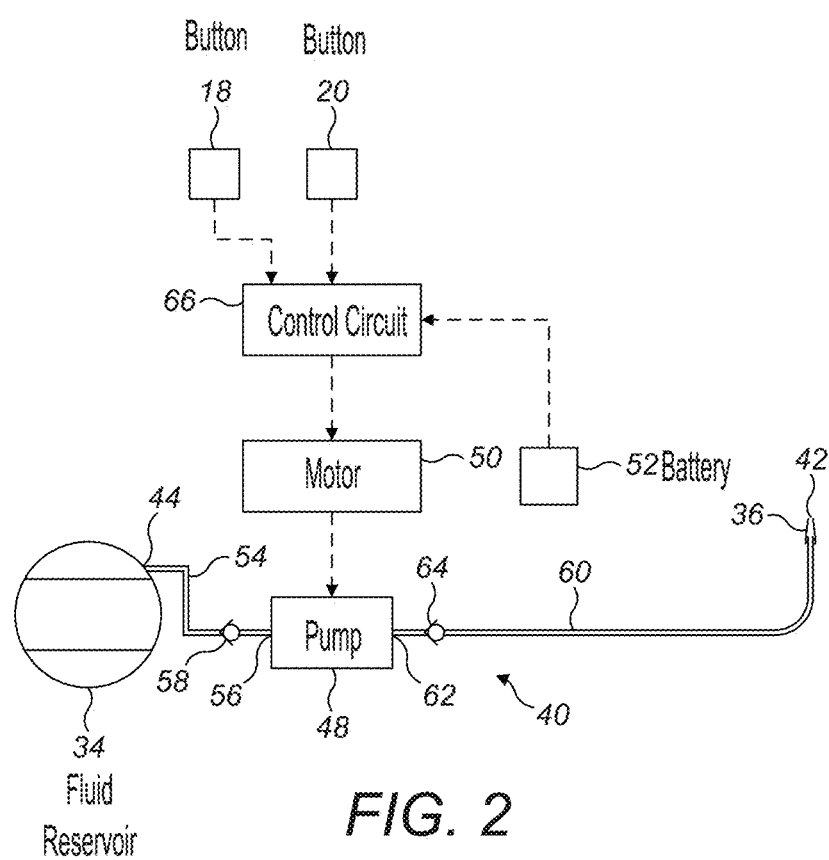
FIG. 2 illustrates schematically components of a fluid delivery system for delivering a burst of a working fluid to the teeth of a user.

The nozzle 36 forms part of a fluid delivery system 40 for receiving working fluid from the fluid reservoir 34 and for delivering bursts of working fluid to the teeth of a user during use of the appliance 10. The tip of the nozzle 36 comprises a fluid outlet 42 through which a burst of working fluid is delivered to the teeth of the user. The fluid delivery system 40 is illustrated schematically in FIG. 2. In overview, the fluid delivery system 40 comprises a fluid inlet 44 for receiving working fluid from the fluid reservoir 34. In this embodiment, the working fluid is a liquid working fluid, which is preferably water. The fluid delivery system 40 comprises a pump assembly 46 for drawing working fluid from the fluid reservoir 34 through the fluid inlet 44, and for delivering a burst of working fluid to the nozzle 36. The pump assembly 46 is located within the handle 12, and comprises a positive displacement pump 48 and a drive for driving the pump 48. The drive preferably comprises a motor 50. A battery 52 for supplying power to the motor 50 is also located in the handle 12. The battery 52 is preferably a rechargeable battery.

A first conduit 54 connects the fluid inlet 44 of the fluid delivery system 40 to a fluid inlet 56 of the pump 48. A first one-way valve 58 is located between the fluid inlet 44 and the pump 48 to prevent water from returning to the reservoir 34 from the pump 48. A second conduit 60 connects a fluid outlet 62 of the pump 48 to the nozzle 36. A second one-way valve 64 is located between the pump 48 and the nozzle 34 to prevent water from returning to the pump 48. A control circuit 66 controls the actuation of the motor 50, and so the motor 50 and the control circuit 66 provide a drive for driving the pump 48. The battery 52 supplies power to the control circuit 66. The control circuit 66 includes a motor controller, which supplies power to the motor 50.

In this embodiment, the control circuit 66 receives signals generated when the user depresses the buttons 18, 20, 22 located on the handle 12 of the appliance 10. Alternatively, or additionally, the control circuit 66 may receive signals which are generated by a sensor located within the appliance, or which are received from a remote device, such as a display or a personal device. For brevity, in the following description the control circuit 66 receives signals which are generated when the user operates one of the buttons 18, 20, 22.

As mentioned above, the fluid reservoir 34 is connected to, and extends at least partially around, the stem 26 of the cleaning tool 14. In this embodiment, the fluid reservoir 34 is annular in shape, and so surrounds the stem 26. The fluid reservoir 34 is preferably located at or towards the end of the stem 26 which is remote from the head 28. The fluid reservoir 34 preferably has a capacity in the range from 5 to 50 ml, and in this embodiment has a capacity of 25 ml.

The fluid inlet 44 is arranged to receive working fluid from the fluid reservoir 34. A filter may be provided in the fluid inlet 44 to prevent dirt from entering the fluid delivery system 40. With reference to FIG. 1(b), working fluid is supplied to the fluid inlet 44 from a fluid port 70 which is in fluid communication with the fluid reservoir 34. The fluid port 70 is located on an external collar 72 of the cleaning tool 14. The collar 72 is moveable relative to both the handle 12 and the stem 26 of the cleaning tool 14. In this embodiment, the collar 72 is rotatable relative to the handle 12 about the longitudinal axis of the cleaning tool 14. To move the collar 72 relative to the handle 12, the user grasps the handle 12 with one hand, and, with the other hand, turns the collar 72 about the longitudinal axis in the desired angular direction. The collar 72 is moveable relative to the handle 12 between first and second angular positions, which are separated by around 90°.

When the collar 72 is in the first position relative to the handle 12, as illustrated in FIG. 1(b), the fluid port 70 is exposed to allow the fluid reservoir 34 to be replenished by the user. The fluid port 70 is exposed by a recessed portion 74 of the body 16 of the handle 12. The recessed portion 74 comprises a curved wall 76. The curved wall 76 is shaped so that, during filling or replenishment of the fluid reservoir 34 by the user, working fluid is guided towards the exposed fluid port 70. When the collar 72 is in the second position relative to the handle 12, the fluid port 70 is occluded by the handle 12 so that the fluid port 70 is not accessible by the user. As the fluid port 70 also serves to supply working fluid to the fluid delivery system 40, in the second position the fluid port 70 is placed in fluid communication with the fluid inlet 44.

The collar 72 may be spaced from the fluid reservoir 34, but in this embodiment the collar 72 forms part of an external wall 78 of the fluid reservoir 34. The external wall 78 of the fluid reservoir 34 is thus moveable relative to the handle 12 and the stem 26 of the cleaning tool 14. The external wall 78 is preferably transparent to allow a user to observe the contents of the fluid reservoir 34, and so assess whether the fluid reservoir 34 requires replenishment prior to the desired use of the appliance 10.

Figure 3:
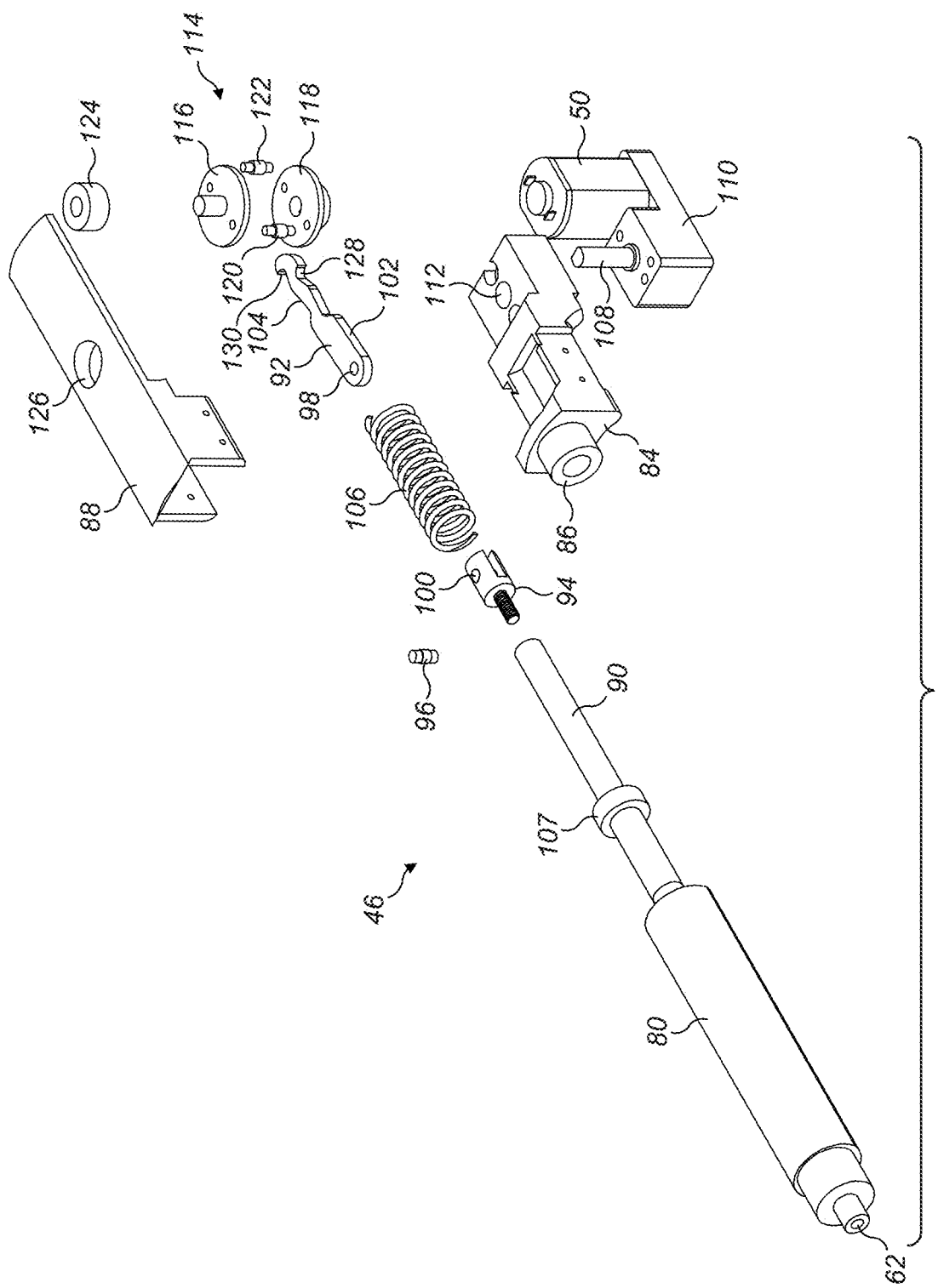
FIG. 3 is an exploded view of a first embodiment of a pump assembly of the fluid delivery system.
Figure 4:
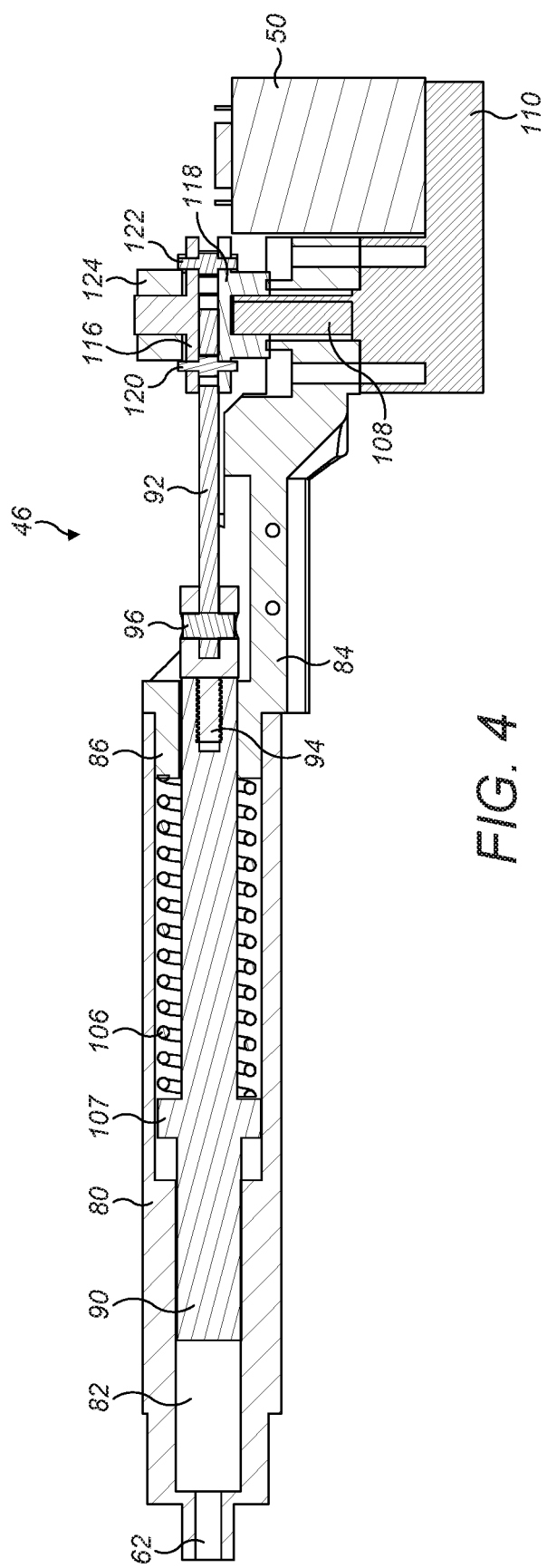
FIG. 4 is a side cross-sectional view of the pump assembly.

A first embodiment of the pump assembly 46 is illustrated in FIGS. 3 and 4. The pump 48 comprises a pump housing, which in this embodiment comprises a plurality of sections. The pump housing comprises a barrel section 80 in which the fluid inlet 56 (located to the side of the pump housing and so not visible in FIGS. 3 to 11) and the fluid outlet 62 are formed. The barrel section 80 of the pump housing defines a fluid chamber 82 for receiving fluid through the fluid inlet 56, and from which fluid is ejected through the fluid outlet 62. The pump housing also comprises a lower housing section 84 connected to the barrel section 80, and which has a cylindrical end portion 86 which is inserted into the end of the barrel section 80 which is remote from the fluid outlet 62.

An upper casing section 88 (illustrated in FIG. 3 only) is connected to the lower casing section 84.

The pump 48 comprises a fluid displacement member which is moveable relative to the fluid chamber 82 to draw fluid into the fluid chamber 82, and subsequently to urge fluid from the fluid chamber 82 towards the nozzle 36. The fluid displacement member is preferably reciprocally moveable relative to the fluid chamber 82. In this embodiment, the pump 48 is in the form of a piston pump, in which the fluid displacement member is a piston 90 which is moveable within the fluid chamber 82. The piston 90 is moveable in a first direction to draw fluid into the fluid chamber 82 from the fluid reservoir 34, and in a second direction, opposite to the first direction, to subsequently urge fluid from the fluid chamber 82 towards the nozzle 36. In this example, the piston 90 is a relatively rigid member which is moveable within the fluid chamber 82 along a linear path between linearly spaced positions. A piston seal (not shown), which may be an O-ring, extends about the piston 90 to form a fluid-tight seal between the fluid chamber 82 and the piston 90. Alternatively, the pump may be in the form of a diaphragm pump, in which the fluid displacement member is a diaphragm bounding one side of the fluid chamber 82. In such a pump, the diaphragm is moveable, through flexing thereof, between different configurations to pump fluid.

The piston 90 forms part of a driven assembly that is driven by the drive of the pump assembly 46. The driven assembly also comprises a first coupling member for coupling the piston 90 to the drive. In this embodiment, the first coupling member comprises an arm 92 which is connected to the piston 90. The arm 92 is connected to the piston 90 by a link rod 94 which has a slot for receiving one end of the arm 92. A link pin 96 passes through aligned apertures 98, 100 formed in the arm 92 and the link rod 94 respectively to connect the arm 92 to the piston 90 so that the arm 92 is pivotably connected to the piston 90. The extent to which the arm 92 is able to pivot about the link pin 96 may be restricted by side portions of the lower casing section 84 or upper casing section 88.

As described in more detail below, the arm 92 comprises a first track and a second track. In this embodiment, each track is provided by a respective side surface of the arm 92. The first track is provided by first side surface 102 of the arm 92, and the second track is provided by second side surface 104, which is opposite to the first side surface 102. Each of the side surfaces 102, 104 is preferably non-linear, and each side surface 102, 104 preferably has a respective different shape. In this embodiment each of the side surfaces 102, 104 has a curved profile.

The pump assembly 46 further comprises an energy storage device which converts kinetic energy generated during the actuation of the pump 48 by the drive into potential energy which is stored by the energy storage device. In this embodiment, the energy storage device is in the form of a spring 106 provided within the pump housing. The spring 106 is a compression spring. As shown in FIG. 4, the spring 106 has a first end which engages the pump housing, in this embodiment the end wall of the cylindrical end portion 86 of the lower housing section 84, and a second end which engages a radially enlarged section 107 of the piston 90 to urge the piston 90 in the second direction, towards the fluid outlet 62.

As mentioned above, the drive comprises a motor 50. The motor 50 is connected to a drive shaft 108 by a gearbox (not shown) located within the gearbox housing 110 so that the drive shaft 108 can be rotated in a chosen direction by the motor 50 upon actuation by the control circuit 66. The drive shaft 108 protrudes through an aperture 112 formed in the lower housing section 84 to engage a rotatable second coupling member for coupling with the first coupling member of the pump 48. In this embodiment, the second coupling member comprises a drum 114. The drum 114 comprises an upper circular plate 116 and a lower circular plate 118 which support a first pin 120 and a second pin 122 therebetween. The first pin 120 and the second pin 122 are located along a diameter of the drum 114, and so such that the second pin 122 is angularly spaced from the first pin 120 by 180°. The drum 114 is supported for rotation relative to the pump housing by an annular bearing 124 which is received within an aperture 126 formed in the upper housing section 88 of the pump housing.

As described in more detail below, the pump assembly 46 is operable in a number of operational modes. In a first operational mode, the volume of fluid drawn into, and subsequently ejected from, the pump 48 is relatively high. In a second operational mode, the volume of fluid drawn into, and subsequently ejected from, the pump 48 is relatively low. In the first operational mode, the volume of fluid drawn into, and subsequently ejected from, the pump 48 is preferably in the range from 0.15 to 0.25 ml. In the second operational mode, the volume of fluid drawn into, and subsequently ejected from, the pump 48 is preferably in the range from 0.05 to 0.20 ml.

The mode in which the pump assembly 46 operates is controlled by the drive in accordance with an input from the control circuit 66, for example in response to the user depressing button 20 of the handle 16. In this embodiment, as described in more detail below, the drive is configured to change the operational mode of the pump assembly 46 through changing the rotational direction of the drum 114.

Figure 5E:
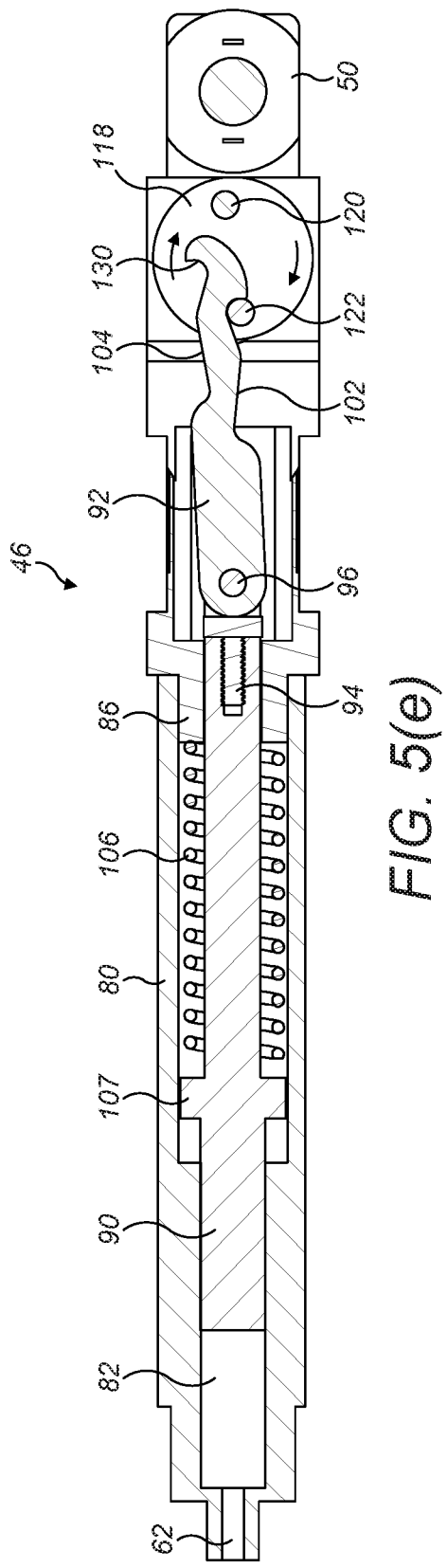
FIG. 5(e) is a top cross-sectional view of the pump assembly in a fifth configuration in the first operational mode.

Operation of the pump assembly 46 when in the first operational mode will now be described with reference to FIGS. 5(a) to 5(e). In this first operational mode, the drum 114 is rotated by the motor 50 in a clockwise direction (as viewed in the figures). In FIG. 5(a), the pump assembly 46 is illustrated in a first configuration following the ejection of a burst of fluid from the fluid chamber 82. The drum 114 is in a first angular position. The piston 90 is in a first position located proximate to the fluid outlet 62. The first pin 120 is located at a first track position of the first track. The first track position is defined by a first seat 128 defined by the first side surface 102 of the arm 92. In this embodiment, the first seat 128 is defined by a portion of the first side surface 102 of locally increased curvature, so that the first side surface 102 defines a hook for retaining the first pin 120 at the first track position. The second pin 122 is spaced from the arm 92.

Whilst the first pin 120 is located in the first seat 128, the pump 48 is coupled to the drive. To draw a volume of fluid into the fluid chamber 82, the control circuit 66 operates the motor to rotate the drum 114 in the clockwise direction. As illustrated in FIGS. 5(b) to 5(c), with rotation of the drum 114 the arm 92 moves with the first pin 120 to move the piston 90 towards a second position, as shown in FIG. 5(c). As the piston 90 moves towards its second position, the spring 106 becomes compressed, converting kinetic energy into potential energy which is stored by the compressed spring 106. The compressed spring 106 thus acts on the piston 90 so as to urge the piston 90 back towards the first position.

In this first operational mode, the pump 48 becomes coupled to the drive when the drum 114 is in the first angular position, as shown in FIG. 5(a), and remains coupled to the drive as the drum 114 rotates to a second angular position, as shown in FIG. 5(c). The angle of rotation of the drum 114 as it moves from the first angular position to the second angular position is approximately 180°, and so in this embodiment the piston 90 reaches its second position following an approximately 180° rotation of the drum 114.

When the piston 90 has reached the second position, the pump assembly 46 is in a primed configuration. The control circuit 66 stops the operation of the motor 50 to maintain the pump assembly 46 in this primed configuration until the user operates the button 18 of the handle 16 to actuate the delivery of a burst of working fluid from the nozzle 36.

As illustrated in FIG. 5(c), when the pump assembly 46 is in the primed configuration, the second pin 122 is either positioned adjacent to the first side surface 102 of the arm, or, as illustrated, so as to lightly abut the first side surface 102 at a second track position with a force which is insufficient to dislodge the arm 92 from the drum 114.

When the user operates the button 18, the control circuit 66 operates the motor 50 to rotate the drum 114 through a further 180° rotational movement. As the drum 114 rotates from the position shown in FIG. 5(d), simultaneously the second pin 122 engages the arm 92 so as to push the arm 92 away from the first pin 120, and the first pin 120 moves away from the first seat 128 (the extent of the movement of the arm away from the first pin 120 is exaggerated in FIG. 5(d) for illustrative purposes only).

When the first pin 120 has moved away from the first seat 128, the pump 48 becomes decoupled from the drive, which enables the compressed spring 106 to use its stored potential energy to expand and actuate the pump 48 in reverse. The piston 90 moves rapidly back towards its first position under the action of the spring 106 to urge a burst of working fluid through the fluid outlet 62 towards the nozzle 36. The time taken for the pump assembly 46 to move from the primed configuration to one in which the pump 48 is decoupled from the drive is preferably in the range from 5 to 30 ms, more preferably between 5 and 15 ms and in this embodiment is around 8 ms.

As the piston 90 moves under the action of the spring 106 towards its first position, the arm 92 moves relative to the drum 114. This relative movement between the arm 92 and the drum 114 causes the second pin 122 to move along the first side arm 102 from the second track position towards the first track position. The movement of the arm 92 under the action of the spring 106 may cause the second pin 122 to move directly to the first track position to become retained by the first seat 128. Alternatively, the movement of the arm 92 under the action of the spring 106 may cause the second pin 122 to move to a position located adjacent to the first track position, so that the second pin 122 moves to the first track position following a relatively small angular movement of the drum 114. When the second pin 122 is first retained by the first seat 128 to couple the pump 48 to the drive, the angular position of the drum 114 is preferably 180° from the angular position at which the first pin 120 had become first retained by the first seat 128. Following the retention of the second pin 122 in the first seat 128, the rotation of the drum 114 is continued by the motor 50 to return the pump assembly to a primed configuration, similar to that shown in FIG. 5(c) but with the angular positions of the first pin 120 and the second pin 122 reversed. The time taken for the pump assembly 46 to return to a primed configuration to eject a second burst of fluid after the user has operated the button 18 to eject the first burst of fluid is preferably in the range from 0.4 to 0.6 seconds, and is preferably around 0.5 seconds. This allows the pump assembly 46 to be operated to eject bursts of fluid at a frequency of around 2 Hz. When the button 18 is next operated by the user, the control circuit 66 repeats the actuation of the motor 50 to rotate the drum 114 through a further 180°. This time, the first pin 120 engages the first side surface 102 at the second track position to move the second pin 122 away from the first seat 128, and subsequently moves along the first side surface 102 towards the first track position as the arm 92 moves relative to the drum 114 under the action of the compressed spring 106.

Figure 6:
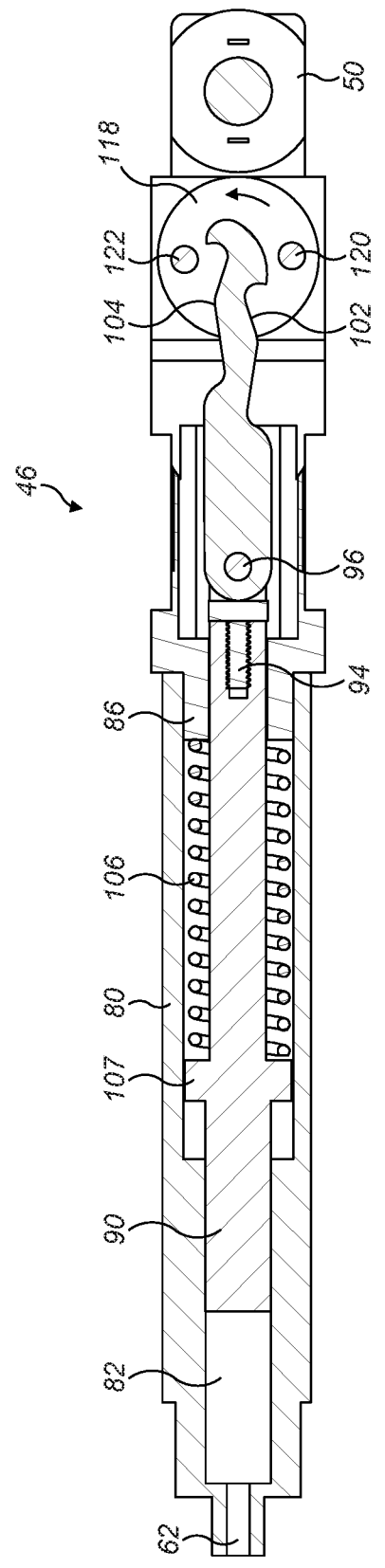
FIG. 6 is a top cross-sectional view of the pump assembly in a configuration during a transition from the first operational mode to a second operational mode.

To change the operational mode of the pump assembly 46 to the second operational mode, in this embodiment the user depresses button 20 of the handle 12. From the primed configuration of the pump assembly 46 as illustrated in FIG. 5(c), the motor 50 is operated by the control circuit 66 to rotate the drum 114 in the opposite angular direction, in this embodiment in an anticlockwise direction (as viewed in the figures). With rotation of the drum 114, the first pin 120 moves away from first seat 128, which results in the pump 48 becoming decoupled from the drive and so the ejection of fluid from the pump 48. FIG. 6 illustrates the configuration of the pump assembly 46 following a rotation of the drum 114 through an angle of 270° from the primed configuration illustrated in FIG. 5(c). In this configuration of the pump assembly 46, neither of the detents 120, 122 is in contact with the arm 92.

Figure 7E:
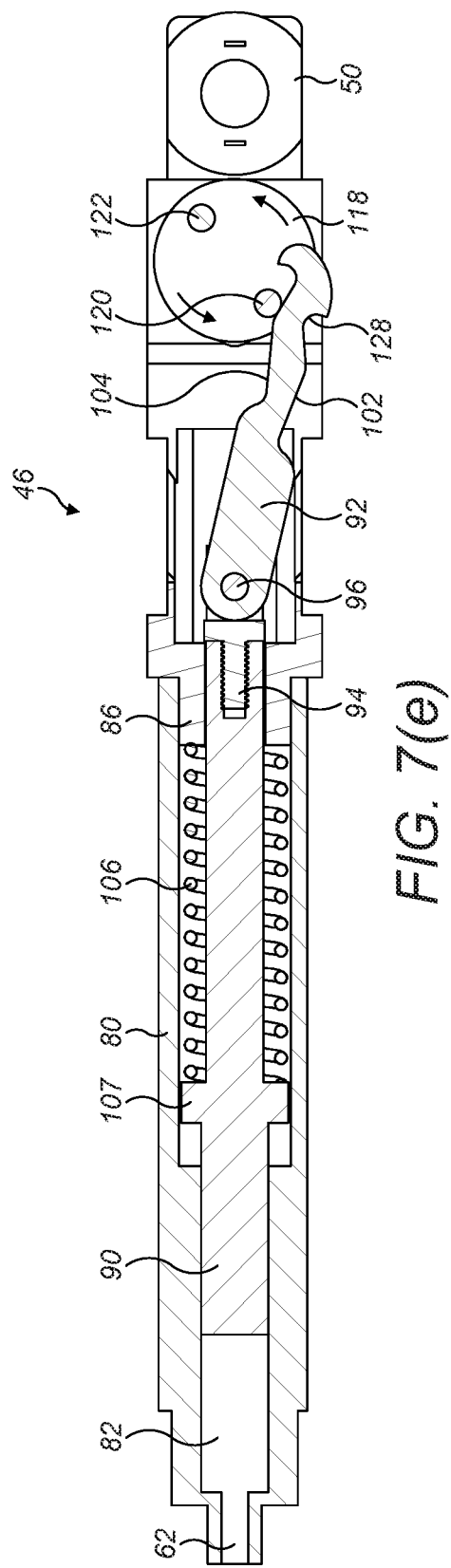
FIG. 7(e) is a top cross-sectional view of the pump assembly in a fifth configuration in the second operational mode.

With continued rotation of the drum 114 in the anticlockwise direction, the second pin 122 engages the second side surface 104 of the arm 92, and moves along the second side surface 104 to a first track position, as illustrated in FIG. 7(a). In this configuration of the pump assembly 46, the drum 114 is in a third angular position. The second pin 122 is located at a first track position of the second track, namely the second side surface 104 of the arm 92. The first track position is defined by a second seat 130 defined by the second side surface 104 of the arm 92. In this embodiment, the second seat 130 is defined by a portion of the second side surface 104 of locally increased curvature, so that the second side surface 104 defines a hook for retaining the second pin 122 at the first track position. The first pin 120 is spaced from the arm 92. The piston 90 is in a first position located proximate to the fluid outlet 62.

Whilst the second pin 122 is located in the second seat 130, the pump 48 is coupled to the drive. To draw a volume of fluid into the fluid chamber 82, the control circuit 66 continues to operate the motor to rotate the drum 114 in the anticlockwise direction. As illustrated in FIGS. 7(b) to 7(c), with rotation of the drum 114 the arm 92 moves with the second pin 122 to move the piston 90 away from the first position. As the piston 90 moves from the first position, the spring 106 becomes compressed, converting kinetic energy into potential energy which is stored by the compressed spring 106. The compressed spring 106 thus acts on the piston 90 so as to urge the piston 90 back towards the first position.

In this second operational mode, the pump 48 becomes coupled to the drive when the drum 114 is in the third angular position, as shown in FIG. 7(a), and remains coupled to the drive as the drum 114 rotates to a fourth angular position, as shown in FIG. 7(c). The angle of rotation of the drum 114 as it moves from the third angular position to the fourth angular position is approximately 150°, and so in this embodiment the piston 90 reaches a third position, intermediate the first position and the second position, following an approximately 150° rotation of the drum 114. Thus, when the pump assembly 46 is in the second operational mode, the stroke of the piston 90 within the fluid chamber 82 is shorter than the stroke of the piston 90 when the pump assembly 46 is in the first operational mode, and so the volume of fluid which is drawn into, and ejected from, the fluid chamber 82 during the second operational mode is smaller than the volume of fluid which is drawn into, and ejected from, the fluid chamber 82 during the first operational mode.

When the piston 90 has reached the third position, as illustrated in FIG. 7(c), the pump assembly 46 is in a primed configuration. The control circuit 66 stops the operation of the motor 50 to maintain the pump assembly 46 in this primed configuration until the user operates the button 18 of the handle 16 to actuate the delivery of a burst of working fluid from the nozzle 36.

As illustrated in FIG. 7(c), when the pump assembly 46 is in this primed configuration, the first pin 120 is either positioned adjacent to the second side surface 104 of the arm, or, as illustrated, so as to lightly abut the second side surface 104 at a second track position with a force which is insufficient to dislodge the arm 92 from the drum 114.

When the user operates the button 18, the control circuit 66 operates the motor 50 to rotate the drum 114 through a further 180° rotational movement in the anticlockwise direction. As the drum 114 rotates to the position shown in FIG. 7(d), simultaneously the first pin 120 engages the arm 92 so as to push the arm 92 away from the second pin 122, and the second pin 122 moves, with rotation of the drum 114, away from the second seat 130 (the extent of the movement of the arm away from the second pin 122 is exaggerated in FIG. 7(d) for illustrative purposes only).

When the second pin 122 has moved away from the second seat 130, the pump 48 becomes decoupled from the drive, which enables the compressed spring 106 to use its stored potential energy to expand and actuate the pump 48 in reverse. The piston 90 moves rapidly back towards its first position under the action of the spring 106 to urge a burst of working fluid through the fluid outlet 62 towards the nozzle 36.

As the piston 90 moves under the action of the spring 106 towards its first position, the arm 92 moves relative to the drum 114. This relative movement between the arm 92 and the drum 114 causes the first pin 120 to move along the second side arm 104 from the second track position towards the first track position. In this second operational mode, the first pin 120 moves to the first track position following a further rotation of the drum 114 by around 30°, during which the pump 48 remains disconnected from the drive.

Upon the retention of the first pin 120 in the second seat 130, the rotation of the drum 114 is continued by the motor 50 to return the pump assembly to a primed configuration, similar to that shown in FIG. 7(c) but with the angular positions of the first pin 120 and the second pin 122 reversed. When the button 18 is next operated by the user, the control circuit 66 repeats the actuation of the motor 50 to rotate the drum 114 in an anticlockwise direction through a further 180°. This time, the second pin 122 engages the second side surface 104 at the second track position to move the first pin 120 away from the second seat 130, and subsequently moves along the second side surface 104 towards the first track position through a combination of the movement of the arm 92 relative to the drum 114 under the action of the compressed spring 106, and rotation of the drum 114.

Figure 8:
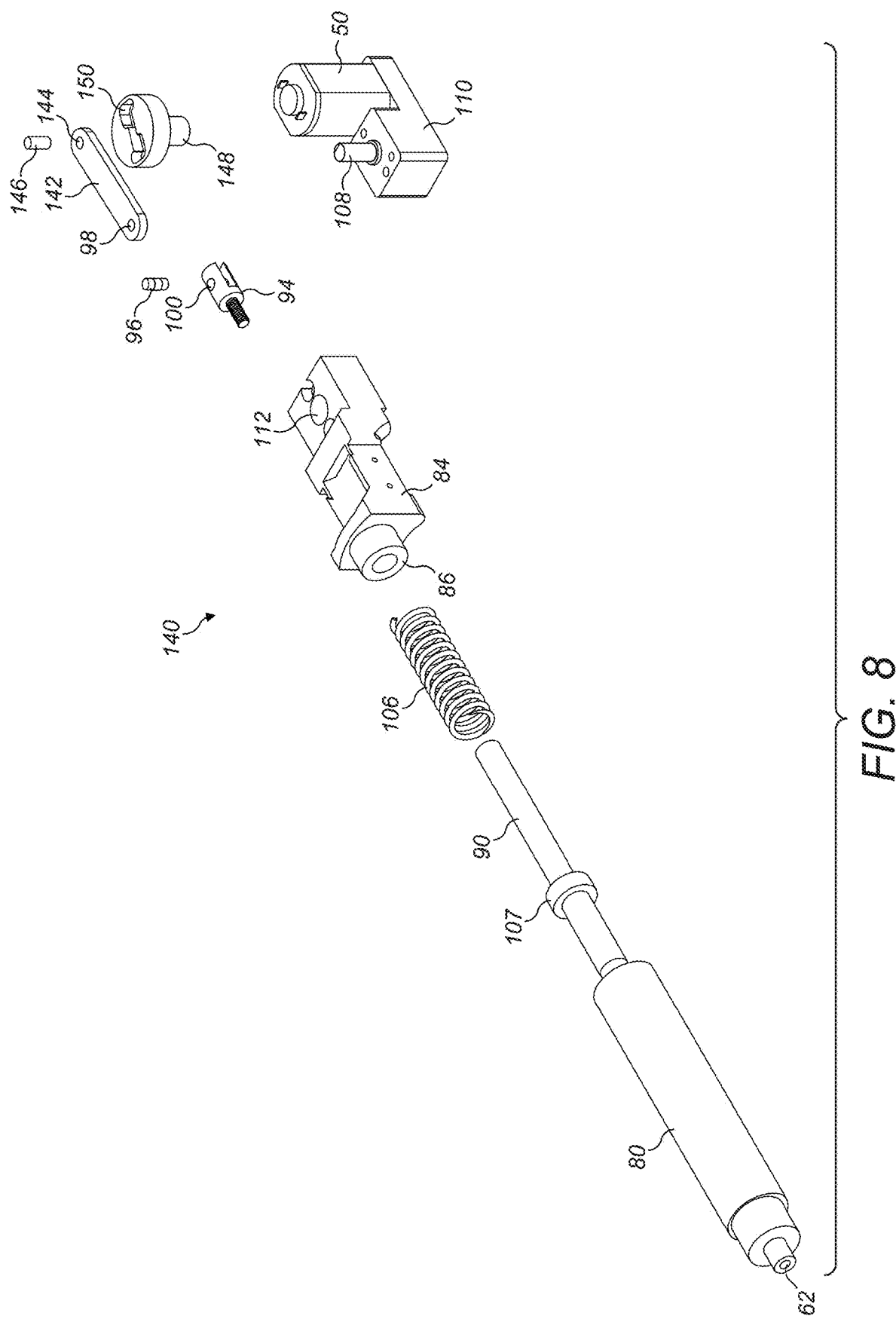
FIG. 8 is an exploded view of a second embodiment of a pump assembly of the fluid delivery system.

A second embodiment of a pump assembly 140 is illustrated in FIGS. 8 and 9. Many of the components of the pump assembly 140 are identical to components of the pump assembly 46, and so will not be described in detail again here. In comparison to the pump assembly 46, the arm 92 of the pump assembly 46 is replaced by arm 142. Similar to arm 92, the arm 142 is connected to the piston 90 by a link rod 94 which has a slot for receiving one end of the arm 142. A link pin 96 passes through aligned apertures 98, 100 formed in the arm 142 and the link rod 94 respectively to connect the arm 142 to the piston 90 so that the arm 142 is pivotably connected to the piston 90. In contrast to the arm 92, the arm 142 includes a second aperture 144 which receives a detent, which is preferably in the form of a pin 146 which extends downwardly from a lower surface of the arm 142.

The drum 114 of the pump assembly 46 is replaced by drum 148. The drum 148 comprises a slot 150 formed in the upper surface of the drum 148 for receiving the pin 146 of the arm 142, and which defines a track along which the pin 146 is moveable relative to the drum 148. The slot 150 extends perpendicular to, and across, the rotational axis of the drum 148. The slot 150 comprises a plurality of seats each for retaining the pin 146 at a respective track position. With reference to FIG. 9(b), the slot 150 comprises a first seat 152 located adjacent one end of the slot 150, and a second seat 154 located adjacent the other end of the slot 150 such that the seats 152, 154 are equally spaced from the rotational axis of the drum 148. Each seat 152, 154 is in the form of an enlarged portion of the slot 150, each seat 152, 154 having a generally semi-circular shape with a radius which is substantially the same as the radius of the pin 146. The first seat 152 and the second seat 154 are located on opposite sides of the slot 150, so that the first seat 152 is angularly spaced from the second seat 154 by 180°.

The slot 150 further comprises a third seat 156 and a fourth seat 158. The third seat 156 is located on the opposite side of the slot 150 to the first seat 152, and the fourth seat 158 is located on the opposite side of the slot 150 to the second seat 154. Again, each seat 156, 158 has the same shape, and is in the form of an enlarged portion of the slot 150, but the third seat 156 and the fourth seat 158 have a greater length, as measured along the length of the slot 150, than the first seat 152 and the second seat 154.

As described in more detail below, the pump assembly 140 is also operable in two operational modes. In a first operational mode, the volume of fluid drawn into, and subsequently ejected from, the pump assembly 140 is relatively high. In a second operational mode, the volume of fluid drawn into, and subsequently ejected from, the pump assembly 140 is relatively low. The mode in which the pump assembly 140 operates is controlled by the drive in accordance with an input from the control circuit 66, for example in response to the user depressing button 20 of the handle 16. In this embodiment, as described in more detail below, the drive is configured to change the operational mode of the pump assembly 140 through changing the rotational direction of the drum 148.

Operation of the pump assembly 140 when in the first operational mode will now be described with reference to FIGS. 10(a) to 10(d). In this first operational mode, the drum 148 is rotated by the motor 50 in an anticlockwise direction (as viewed in the figures). In FIG. 10(a), the pump assembly 140 is illustrated in a first configuration following the ejection of a burst of fluid from the fluid chamber 82. The drum 148 is in a first angular position. The piston 90 is in a first position located proximate to the fluid outlet 62. The pin 146 is located in the first seat 152, which corresponds to a first track position of the slot 150. Whilst the pin 148 is retained by the first seat 152 so as to be in a fixed position relative to the drum 148, the pump 48 is coupled to the drive. To draw a volume of fluid into the fluid chamber 82, the control circuit 66 operates the motor to rotate the drum 148 in the anticlockwise direction. As illustrated in FIGS. 10(b) to 10(d), with rotation of the drum 148 the arm 142 moves to move the piston 90 towards a second position, as shown in FIG. 10(d). As the piston 90 moves towards its second position, the spring 106 becomes compressed, converting kinetic energy into potential energy which is stored by the compressed spring 106. The compressed spring 106 thus acts on the piston 90 so as to urge the piston 90 back towards the first position.

In this first operational mode, the pump 48 becomes coupled to the drive when the drum 148 is in the first angular position, as shown in FIG. 10(a), and remains coupled to the drive as the drum 148 rotates to a second angular position, as shown in FIG. 10(d). The angle of rotation of the drum 148 as it moves from the first angular position to the second angular position is approximately 165°, and so in this embodiment the piston 90 reaches its second position following an approximately 165° rotation of the drum 148.

When the piston 90 has reached the second position, the pump assembly 140 is in a primed configuration. The control circuit 66 stops the operation of the motor 50 to maintain the pump assembly 140 in this primed configuration until the user operates the button 18 of the handle 16 to actuate the delivery of a burst of working fluid from the nozzle 36.

When the user operates the button 18, the control circuit 66 operates the motor 50 to rotate the drum 148 in the anticlockwise direction through a 180° rotational movement. As the drum 148 rotates from the position shown in FIG. 10(d), the slot 150 becomes oriented such that the pin 146 can be pulled away from the first seat 152 under the action of the force applied to the arm 142 by the spring 106. When the pin 146 has moved away from the first seat 152, the pump 48 becomes decoupled from the drive, which enables the compressed spring 106 to use its stored potential energy to expand and actuate the pump 48 in reverse. The piston 90 moves rapidly back towards its first position under the action of the spring 106 to urge a burst of working fluid through the fluid outlet 62 towards the nozzle 36.

As the piston 90 moves under the action of the spring 106 towards its first position, the arm 142 moves relative to the drum 148. This relative movement between the arm 142 and the drum 148 causes the pin 146 to move rapidly along the slot 150, from one end of the slot 150 to the other, to a position located adjacent to the second seat 154, or second track position. In this embodiment, the pin 146 moves along the slot 150 to become retained by the second seat 154 following a relatively small angular movement of the drum 148, in this embodiment around 30°. When the pin 146 is first retained by the second seat 154 to couple the pump 48 to the drive, the angular position of the drum 148 is preferably 180° from the angular position at which the pin 146 had become first retained by the first seat 152. Following the retention of the pin 146 by the second seat 154, the rotation of the drum 148 is continued by the motor 50 to return the pump assembly 140 to a primed configuration, similar to that shown in FIG. 10(d) but with the angular positions of the first seat 152 and the second seat 154 reversed. When the button 18 is next operated by the user, the control circuit 66 repeats the actuation of the motor 50 to rotate the drum 148 through a further 180°. This time, under the action of the spring 106 the pin 146 moves away from the second seat 154 to decouple the pump 48 from the drive, and subsequently moves along the slot 150 towards the first seat 152 with relative movement between the arm 142 and the drum 148.

To change the operational mode of the pump assembly 140 to the second operational mode, in this embodiment the user depresses button 20 of the handle 12. From the primed configuration of the pump assembly 140 as illustrated in FIG. 10(d), the motor 50 is operated by the control circuit 66 to rotate the drum 148 in the opposite angular direction, in this embodiment in a clockwise direction (as viewed in the figures). With rotation of the drum 148, under the action of the compressed spring 106 the pin 146 moves away from first seat 152, which results in the pump 48 becoming decoupled from the drive. As described above, this enables the compressed spring 106 to use its stored potential energy to expand and actuate the pump 48 in reverse. The piston 90 moves rapidly back towards its first position under the action of the spring 106 to urge a burst of working fluid through the fluid outlet 62 towards the nozzle 36. As the piston 90 moves under the action of the spring 106 towards its first position, the arm 142 moves relative to the drum 148. This relative movement between the arm 142 and the drum 148 causes the pin 146 to move rapidly along the slot 150, from one end of the slot 150 to the other. However, with continued rotation of the drum 148 in the clockwise direction, the pin 146 moves along the third seat 156 to become retained by the third seat 156 once the drum 148 has rotated to a third angular position, as illustrated in FIG. 11(a). In this angular position of the drum 148, the pin 146 may be considered to be located in a third track position.

Figure 11C:
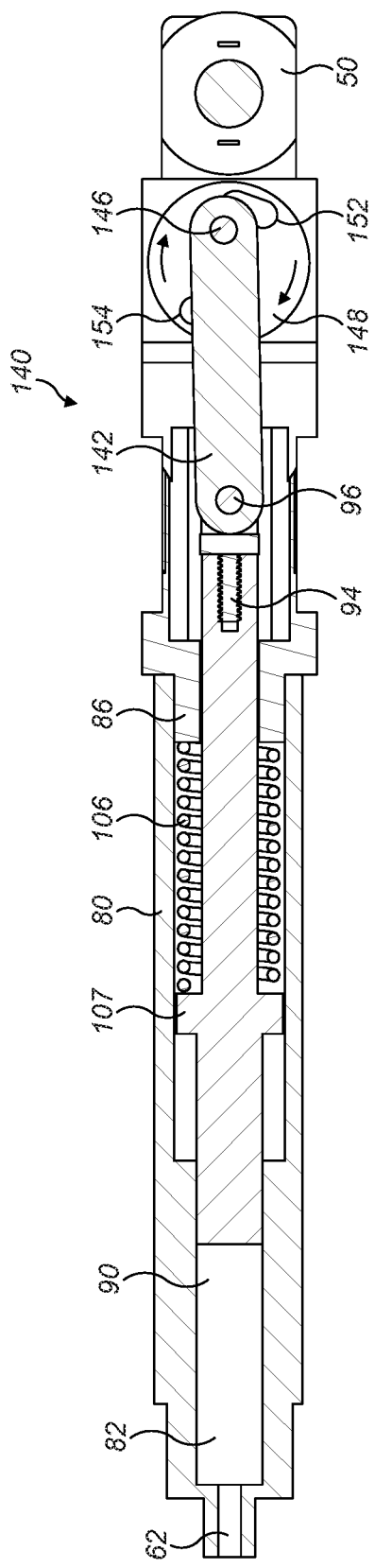
FIG. 11(c) is a top cross-sectional view of the pump assembly in a third configuration in the second operational mode.

Whilst the pin 146 is retained by the third seat 156, the pump 48 is coupled to the drive. To draw a volume of fluid into the fluid chamber 82, the control circuit 66 continues to operate the motor to rotate the drum 148 in the anticlockwise direction. As illustrated in FIGS. 11(b) to 11(c), with rotation of the drum 148 the arm 142 moves with the drum 148 to move the piston 90 away from the first position. As the piston 90 moves from the first position, the spring 106 becomes compressed, converting kinetic energy into potential energy which is stored by the compressed spring 106. The compressed spring 106 thus acts on the piston 90 so as to urge the piston 90 back towards the first position.

In this second operational mode, the pump 48 becomes coupled to the drive when the drum 148 is in the third angular position, as shown in FIG. 11(a), and remains coupled to the drive as the drum 148 rotates to a fourth angular position, as shown in FIG. 11(c). The angle of rotation of the drum 148 as it moves from the third angular position to the fourth angular position is approximately 90°, and so in this embodiment the piston 90 reaches a third position, intermediate the first position and the second position, following an approximately 90° rotation of the drum 148. Thus, when the pump assembly 140 is in the second operational mode, the stroke of the piston 90 within the fluid chamber 82 is shorter than the stroke of the piston 90 when the pump assembly 140 is in the first operational mode, and so the volume of fluid which is drawn into, and ejected from, the fluid chamber 82 during the second operational mode is smaller than the volume of fluid which is drawn into, and ejected from, the fluid chamber 82 during the first operational mode.

When the piston 90 has reached the third position, as illustrated in FIG. 11(c), the pump assembly 140 is in a primed configuration. The control circuit 66 stops the operation of the motor 50 to maintain the pump assembly 140 in this primed configuration until the user operates the button 18 of the handle 16 to actuate the delivery of a burst of working fluid from the nozzle 36.

When the user operates the button 18, the control circuit 66 operates the motor 50 to rotate the drum 148 through a 180° rotational movement in the clockwise direction. As the drum 148 rotates to the position shown in FIG. 11(d), the slot 150 becomes oriented such that the pin 146 can be pulled away from the third seat 156 under the action of the force applied to the arm 142 by the spring 106. When the pin 146 has moved away from the third seat 156, the pump 48 becomes decoupled from the drive, which enables the compressed spring 106 to use its stored potential energy to expand and actuate the pump 48 in reverse. The piston 90 moves rapidly back towards its first position under the action of the spring 106 to urge a burst of working fluid through the fluid outlet 62 towards the nozzle 36.

Figure 11D:
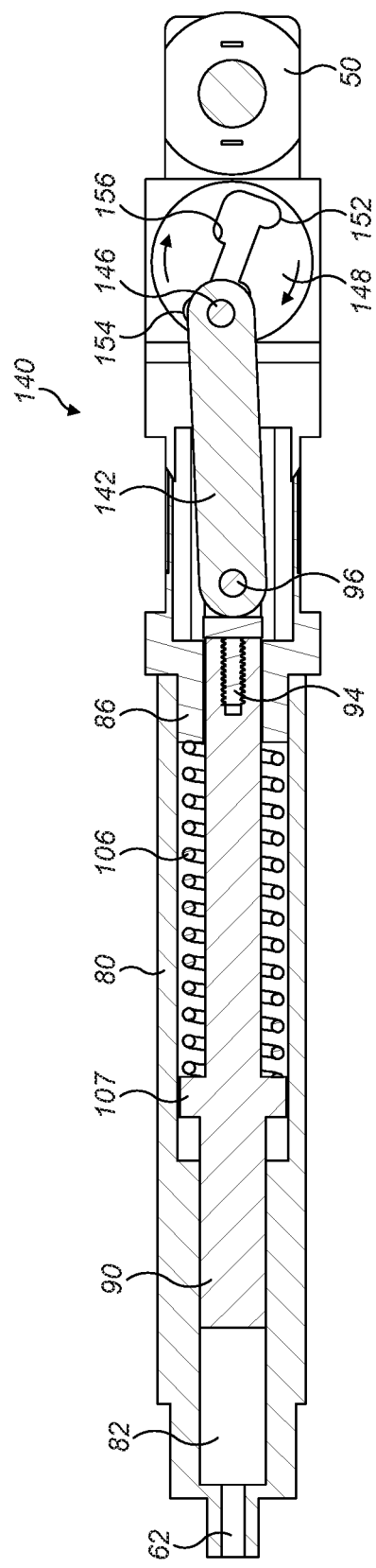
FIG. 11(d) is a top cross-sectional view of the pump assembly in a fourth configuration in the second operational mode.

As the piston 90 moves under the action of the spring 106 towards its first position, the arm 142 moves relative to the drum 148. This relative movement between the arm 142 and the drum 148 causes the pin 146 to move rapidly along the slot 150 to a position located adjacent to the second seat 154, as shown in FIG. 11(d). However, as the drum 148 is rotating in an opposite angular direction to the first operational mode, the pin 146 moves along the slot 150 away from the second seat 154 to the fourth seat 158 following a relatively large angular movement of the drum 148, in this embodiment around 90°. When the pin 146 becomes retained by the fourth seat 158, the pin 146 may be considered to be in a fourth track position.

When the pin 146 is first retained by the fourth seat 158 to couple the pump 48 to the drive, the angular position of the drum 148 is preferably 180° from the angular position at which the pin 146 had become first retained by the third seat 156. Following the retention of the pin 146 by the fourth seat 158, the rotation of the drum 148 is continued by the motor 50 to return the pump assembly 140 to a primed configuration, similar to that shown in FIG. 11(c) but with the angular positions of the third seat 156 and the fourth seat 158 reversed. When the button 18 is next operated by the user, the control circuit 66 repeats the actuation of the motor 50 to rotate the drum 148 through a further 180° in the clockwise direction. This time, under the action of the spring 10 the pin 146 moves away from the fourth seat 158 to decouple the pump 48 from the drive, and subsequently moves along the slot 150 towards the third seat 156 with relative movement between the arm 142 and the drum 148.

The invention claimed is:

1. A pump assembly for a dental cleaning appliance, the pump assembly comprising:
   a positive displacement pump comprising a fluid chamber having a fluid inlet connectable to a source of fluid, and a fluid outlet;
   a drive for actuating the pump to draw fluid into the fluid chamber through the fluid inlet;
   an energy storer that converts kinetic energy generated during actuation of the pump by the drive into potential energy, and stores the potential energy; and
   a first coupling member connected to the pump and a second coupling member connected to the drive, the second coupling member being rotatable relative to the first coupling member;
   wherein one of the coupling members comprises a track for receiving a first detent disposed on the other coupling member, the first detent being moveable between a first track position, in which the drive is coupled to the pump, and a second track position with relative movement between the coupling members;
   whereby as the second coupling member rotates in a rotational direction from a first angular position, in which the first detent is in the first track position, to a second angular position which is angularly spaced from the first angular position, the first detent remains in the first track position so that the pump is actuated by the drive to draw fluid into the fluid chamber, and as the second coupling member rotates in the rotational direction from the second angular position towards the first angular position, the first detent becomes spaced from the first track position to enable the energy storer to use stored potential energy to actuate the pump to urge a burst of fluid from the fluid chamber through the fluid outlet.

2. The pump assembly of claim 1, wherein the track comprises a seat for receiving the first detent at the first track position.

3. The pump assembly of claim 1, wherein the pump comprises a fluid displacement member which is moveable relative to the fluid chamber along a linear path to draw fluid into the fluid chamber.

4. The pump assembly of claim 3, wherein the energy storer is arranged to engage the fluid displacement member.

5. The pump assembly of claim 4, wherein the energy storer comprises a spring.

6. The pump assembly of claim 3, wherein the first coupling member comprises an arm pivotably connected to the fluid displacement member.

7. The pump assembly of claim 6, wherein the first coupling member is the one of the coupling members, and the second coupling member is the other coupling member.

8. The pump assembly of claim 7, wherein the track is provided by a first side surface of the arm.

9. The pump assembly of claim 8, wherein the first detent becomes spaced from the first side surface of the arm as the second coupling member rotates in the rotational direction from the second angular position towards the first angular position.

10. The pump assembly of claim 9, wherein the second coupling member comprises the first detent and a second detent which engages the first side surface of the arm as the second coupling member rotates in the rotational direction from the second angular position towards the first angular position to move the arm away from the first detent.

11. The pump assembly of claim 10, wherein the first detent and the second detent are located at opposite angular positions on the second coupling member.

12. The pump assembly of claim 10, wherein the second detent is arranged to engage the first side surface of the arm at the second track position.

13. The pump assembly of claim 12, wherein, upon actuation of the pump by the energy storer, movement of the arm relative to the second coupling member causes the second detent to move along the first side surface from the second track position towards the first track position.

14. The pump assembly of claim 13, wherein the arm comprises a second track for receiving the first detent with rotation of the second coupling member in a second rotational direction opposite to the first rotational direction, the first detent being moveable along the second track between a first track position, in which the drive is coupled to the pump, and a second track position with relative movement between the coupling members;
whereby as the second coupling member rotates in the second rotational direction from a third angular position, in which the first detent is in the first track position of the second track, to a fourth angular position which is angularly spaced from the third angular position, the first detent remains in the first track position of the second track so that the pump is actuated by the drive to draw fluid into the fluid chamber, and as the second coupling member rotates in the second rotational direction from the fourth angular position towards the third angular position, the first detent becomes spaced from the first track position of the second track to enable the energy storer to use stored potential energy to actuate the pump to urge a burst of fluid from the fluid chamber through the fluid outlet.

15. The pump assembly of claim 14, wherein the second track is located on a second side surface of the arm.

16. The pump assembly of claim 15, wherein the second side surface of the arm comprises a second seat for receiving the first detent at a first track position of the second track.

17. The pump assembly of claim 15, wherein the first detent becomes spaced from the second side surface of the arm as the second coupling member rotates in the second rotational direction from the fourth angular position towards the third angular position.

18. The pump assembly of claim 17, wherein the second detent engages the second side surface of the arm as the second coupling member rotates in the second rotational direction from the fourth angular position towards the third angular position to move the arm away from the first detent.

19. The pump assembly of claim 18, wherein the second detent is arranged to engage the second side surface of the arm at the second track position of the second track.

20. The pump assembly of claim 19, wherein, upon actuation of the pump by the energy storer, movement of the arm relative to the second coupling member causes the second detent to move along the second side surface from the second track position towards the first track position.

21. The pump assembly of claim 20, wherein upon actuation of the pump by the energy storer through rotation of the second coupling member in the first rotational direction, the extent of movement of the second detent along the first side surface is greater than the extent of movement of the second detent along the second side surface upon actuation of the pump by the energy storer through rotation of the second coupling member in the second rotational direction.

22. The pump assembly of claim 5, wherein the second coupling member is the one of the coupling members, and the first coupling member is the other coupling member.

23. The pump assembly of claim 22, wherein the track is provided by a slot formed in the second coupling member.

24. The pump assembly of claim 23, wherein the first track position is located at or adjacent to one end of the slot, and the second track position is located at or adjacent the other end of the slot.

25. The pump assembly of claim 24, wherein the first track position and the second track position are located at opposite angular positions of the second coupling member.

26. The pump assembly of claim 24, wherein the slot comprises at each track position a respective seat for receiving the first detent.

27. The pump assembly of claim 24, wherein the first detent moves from the first track position to the second track position as the second coupling member rotates in the rotational direction from the second angular position towards the first angular position.

28. A dental cleaning appliance comprising:
a handle;
a fluid reservoir for storing a working fluid; and
a fluid delivery system for receiving working fluid from the fluid reservoir, and for delivering a burst of working fluid to the teeth of a user;

wherein the fluid delivery system comprises the pump assembly of claim 1.

\* \* \* \* \*